(12) United States Patent
Chang et al.

(10) Patent No.: US 8,909,196 B2
(45) Date of Patent: Dec. 9, 2014

(54) SYSTEMS AND METHODS FOR FACILITATING COMMUNICATION BETWEEN MOBILE DEVICES AND WIRELESS ACCESS POINTS

(71) Applicant: Actiontec Electronics, Inc., Sunnyvale, CA (US)

(72) Inventors: Tsung-Yen Dean Chang, Los Altos Hills, CA (US); Bo Xiong, San Ramon, CA (US); Roozbeh Spencer Behroozi, San Jose, CA (US)

(73) Assignee: Actiontec Electronics, Inc., Sunnyvale, CA (US)

( * ) Notice: Subject to any disclaimer, the term of this patent is extended or adjusted under 35 U.S.C. 154(b) by 0 days.

(21) Appl. No.: 13/710,228

(22) Filed: Dec. 10, 2012

(65) Prior Publication Data

US 2014/0162600 A1  Jun. 12, 2014

(51) Int. Cl.
*H04W 12/06* (2009.01)
*H04W 84/12* (2009.01)

(52) U.S. Cl.
CPC .............. *H04W 12/06* (2013.01); *H04W 84/12* (2013.01)
USPC ........................... 455/411; 709/238; 370/311

(58) Field of Classification Search
CPC ...... H04L 63/08; H04L 9/0883; H04W 64/00
USPC .................. 455/411, 456.1; 380/278
See application file for complete search history.

(56) References Cited

U.S. PATENT DOCUMENTS

| | | | |
|---|---|---|---|
| 7,209,437 B1 | 4/2007 | Hodgkinson et al. | |
| 7,209,440 B1 | 4/2007 | Walsh et al. | |
| 7,209,458 B2 | 4/2007 | Ahvonen et al. | |
| 7,734,738 B2 | 6/2010 | Daniel et al. | |
| 7,948,883 B1 | 5/2011 | Croft et al. | |
| 8,280,009 B2 | 10/2012 | Stepanian | |
| 8,488,461 B2 | 7/2013 | Pan et al. | |

(Continued)

FOREIGN PATENT DOCUMENTS

| | | |
|---|---|---|
| WO | WO-2008/153740 A1 | 12/2008 |
| WO | WO 2010/148732 | 12/2010 |

OTHER PUBLICATIONS

International Search Report and Written Opinion dated Oct. 23, 2008 for PCT/US2008/006568.

(Continued)

*Primary Examiner* — Phuoc H Doan
(74) *Attorney, Agent, or Firm* — Foley & Lardner LLP; Christopher C. Bolten; Nicola A. Pisano

(57) ABSTRACT

Under one aspect of the present invention, a system is provided for facilitating communication between a mobile device and a wireless access point (WAP). The mobile device includes a processor and a non-volatile computer readable medium. The system may include an identifier disposed on the WAP; and a communication application stored in the non-volatile computer readable medium of the mobile device and configured to cause the processor of the mobile device to perform the steps of: (a) obtaining a digital representation of the identifier of the WAP; (b) connecting to the WAP; (c) transmitting the digital representation of the identifier to the WAP; (d) receiving from the WAP an ESSID and a credential responsive to the transmitted digital representation; and (e) connecting to the selected wireless access point based on the ESSID and credential.

24 Claims, 11 Drawing Sheets

(56) References Cited

U.S. PATENT DOCUMENTS

| | | |
|---|---|---|
| 2001/0052083 A1 | 12/2001 | Willins et al. |
| 2002/0064149 A1 | 5/2002 | Elliott et al. |
| 2002/0080786 A1 | 6/2002 | Roberts |
| 2003/0081613 A1 | 5/2003 | Yamanaka |
| 2003/0126272 A1 | 7/2003 | Corl et al. |
| 2004/0062267 A1 | 4/2004 | Minami et al. |
| 2006/0018323 A1 | 1/2006 | Kempe |
| 2007/0201473 A1 | 8/2007 | Bhatia et al. |
| 2007/0206617 A1 | 9/2007 | Andreasen et al. |
| 2007/0271590 A1 | 11/2007 | Gulas et al. |
| 2007/0297335 A1 | 12/2007 | Picher-Dempsey |
| 2008/0291916 A1 | 11/2008 | Xiong et al. |
| 2008/0313278 A1 | 12/2008 | Hochberg |
| 2010/0246509 A1 | 9/2010 | Chen |
| 2012/0179790 A1 | 7/2012 | Kim et al. |
| 2013/0305329 A1 | 11/2013 | Zhang |
| 2013/0336487 A1* | 12/2013 | Jan et al. .................. 380/278 |

OTHER PUBLICATIONS

Mahajan, et al., "Controlling High-Bandwidth Flows at the Congested Router," Proc. ACM 9th International Conference on Network Protocols (ICNP), (2001).

Talukder, et al., "QoSIP: A QoS Aware IP Routing Protocol for Multimedia Data," Advanced Communication Technology, 8th International Conference, (2006), 618-623.

TCP/IP Ports, accessed May 9, 2007, www.chebucto.ns.ca/~rakerman/port-table.html: 1-16.

* cited by examiner

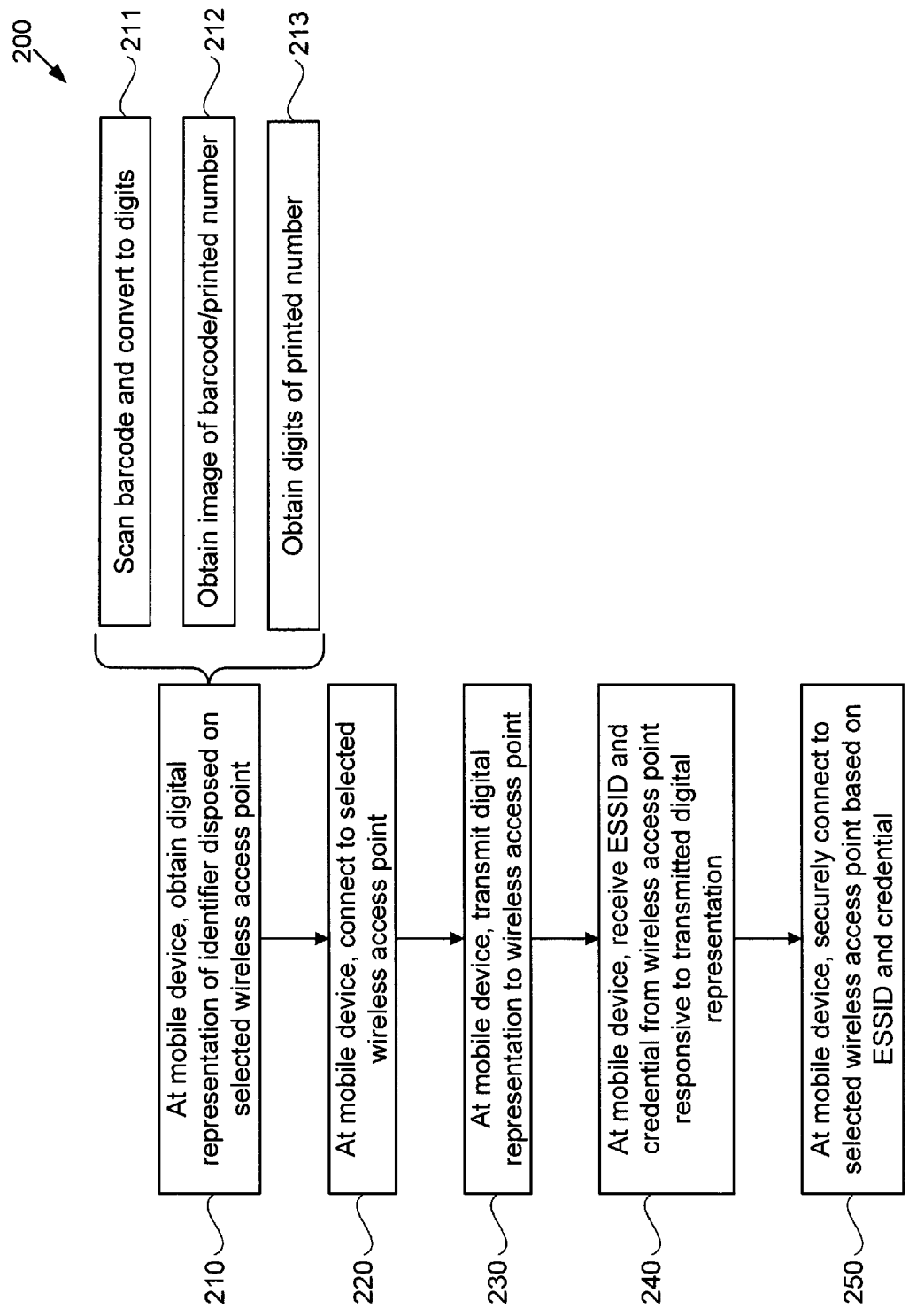

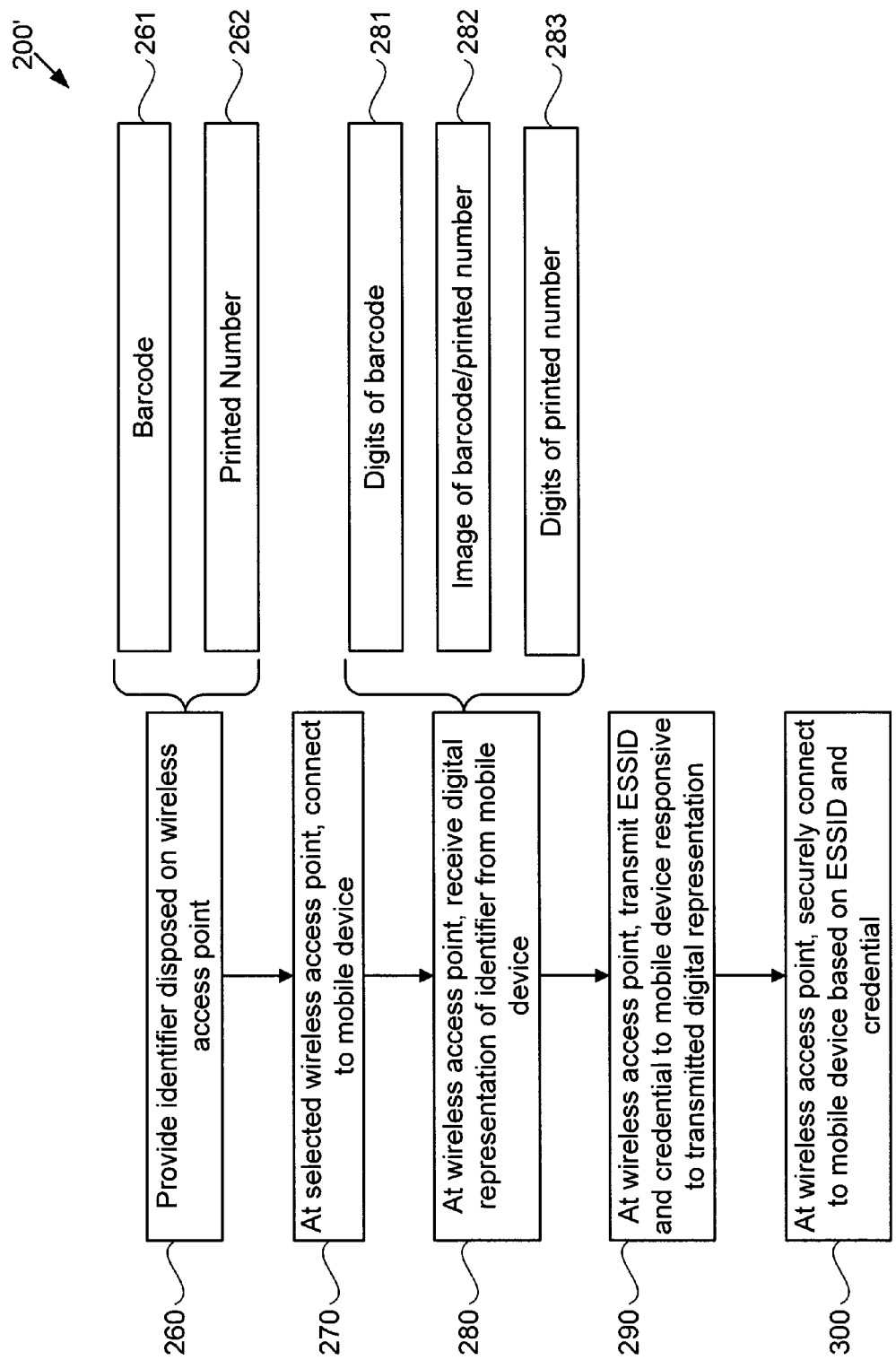

| Digital Representation of Identifier | Associated Wireless Access Point Serial Number | Pointers to Associated Configuration Parameter |
|---|---|---|
| Barcode-1 (digits or image) PN-1 (digits or image) | WAP-1 Serial Number | Pointers to ESSIDs-1, Credentials-1A |
| Barcode-2 (digits or image) PN-2 (digits or image) | WAP-2 Serial Number | Pointers to ESSIDs-2, Credentials-2A |
| ... | ... | ... |
| Barcode-n (digits or image) PN-n (digits or image) | WAP-n Serial Number | Pointers to ESSIDs-n, Credentials-nA |

FIG. 5

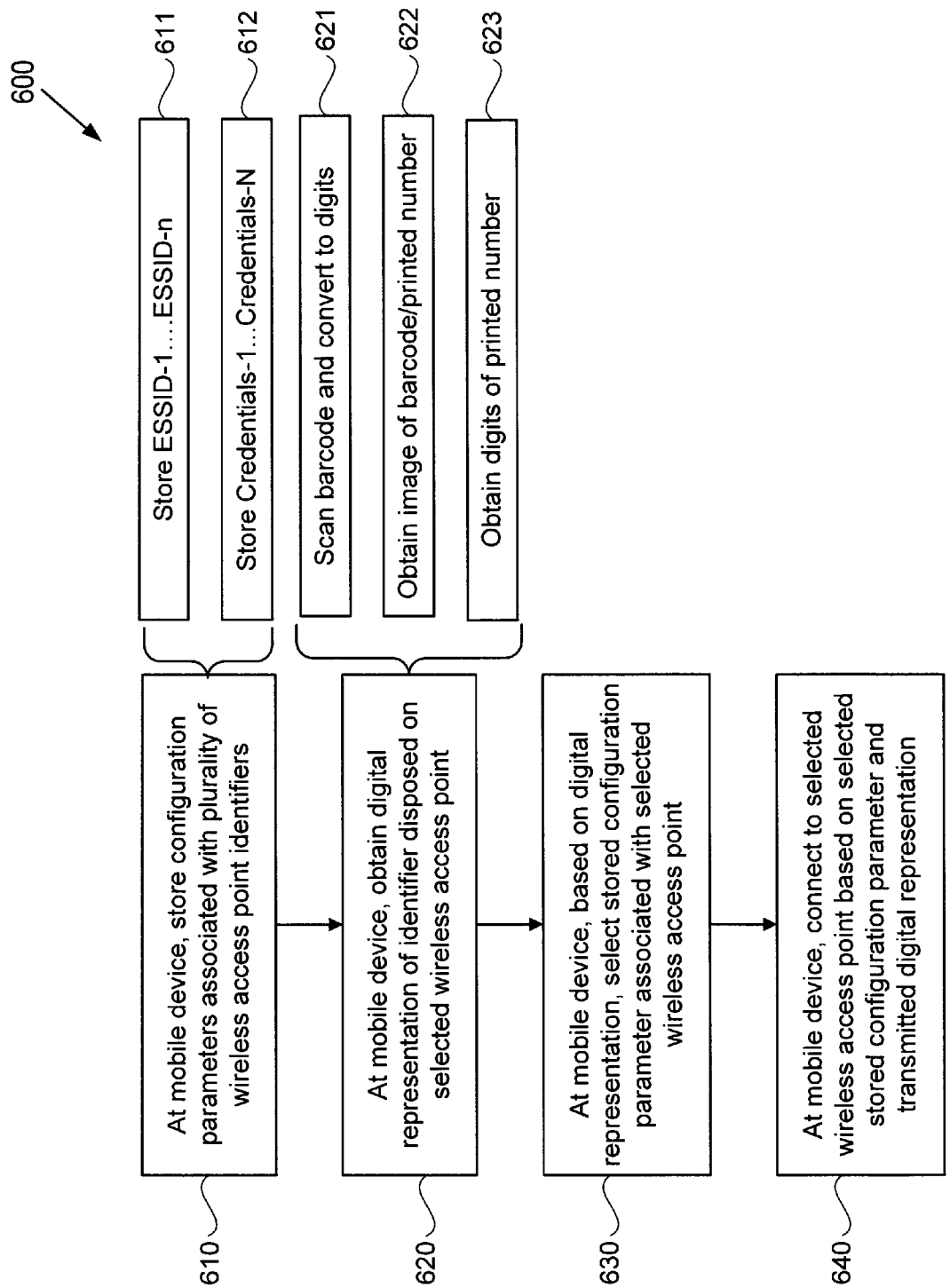

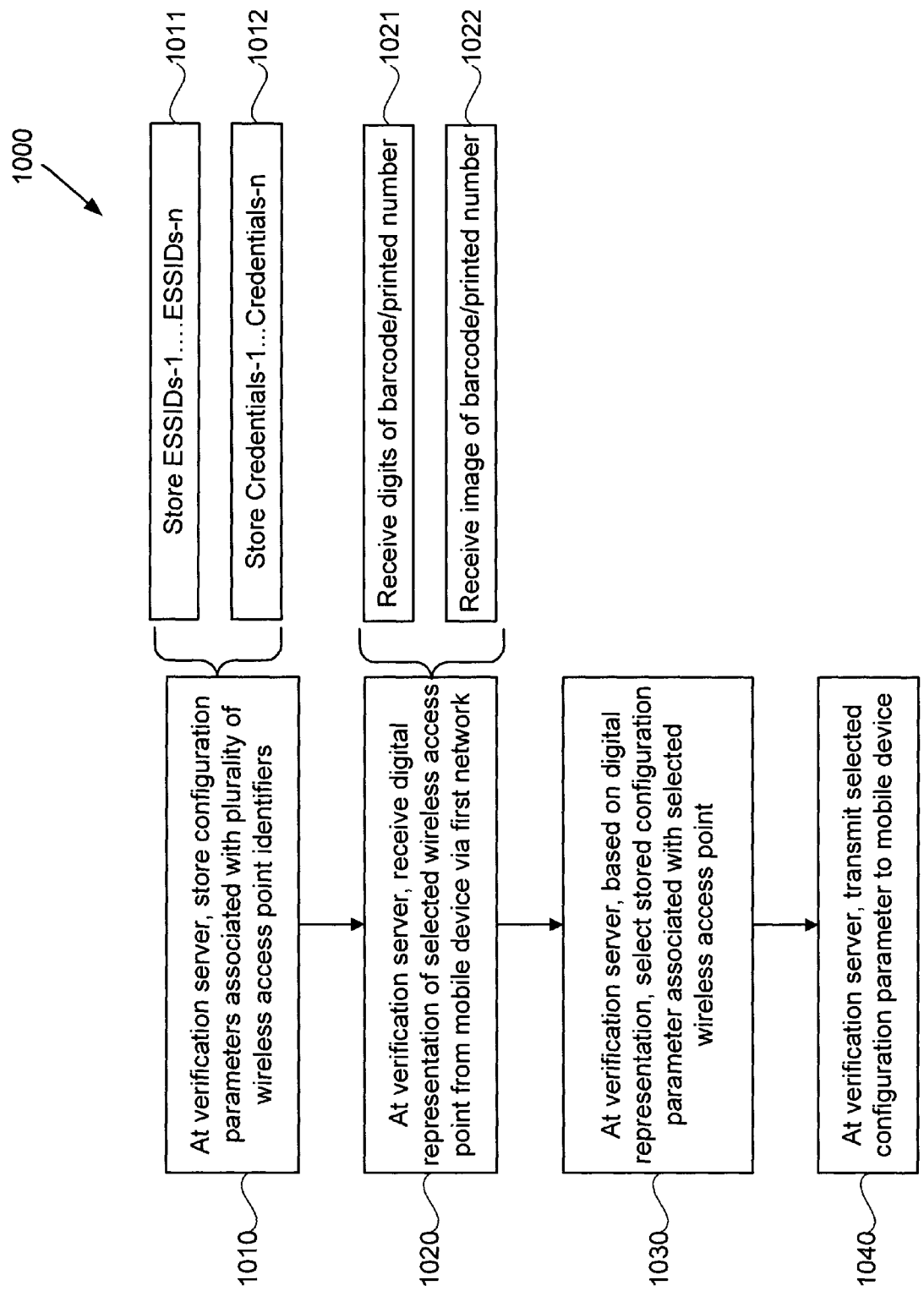

SYSTEMS AND METHODS FOR FACILITATING COMMUNICATION BETWEEN MOBILE DEVICES AND WIRELESS ACCESS POINTS

FIELD OF THE INVENTION

This application relates to communication between mobile devices and wireless access points.

BACKGROUND OF THE INVENTION

Devices may use a variety of wireless protocols to communicate with one another, such as IEEE 801.11 (WiFi) or Bluetooth. For example, a wireless access point (WAP) may be wirelessly connected to devices such as smartphones, laptop computers, and the like, and may provide a connection between such devices and the Internet or other wired network to which the WAP is connected. However, depending on the particular devices, a user may need to have a certain amount of technical expertise to initially establish a connection between the devices.

For example, a WAP using IEEE 802.11 may be assigned one or more extended service set identifiers, or ESSIDs (sometimes referred to as SSIDs), each of which may be a sequence of numbers and/or letters that identifies that WAP to other devices, preferably uniquely. The WAP may broadcast one or more of its ESSIDs so as to alert other devices to the WAP's presence on the network. The WAP also may maintain one or more of its ESSIDs as a "hidden" or "cloaked" ESSID that the WAP does not broadcast. The WAP also may have one or more credentials, such as a login and password, or an encryption key, which may be associated with a particular one of the ESSIDs. The WAP may be programmed to permit devices to connect that (1) transmit the proper ESSID to the WAP, and (2) transmit the proper credential to the WAP.

Technically savvy users may readily be able to obtain the ESSID of a WAP and the proper credential, and to suitably configure a device to wirelessly transmit that ESSID and credential to the WAP so as to connect to the WAP. However, many users may lack such technical knowledge, and indeed may not know how to find the ESSID or credential needed to connect to a WAP, even in their own home, let alone how to configure their device appropriately. As such, some users may spend a great amount of time obtaining the needed information and learning how to appropriately configure their devices, while other users may place lengthy service calls to the WAP provider for assistance in connecting their device to the WAP, while still other users may decide that it is just too difficult to connect. In each case, the user's experience may be disappointing, costly, and time consuming.

Thus, what is needed is a system and method to facilitate communication between wireless access points and mobile devices.

SUMMARY OF THE INVENTION

Embodiments of the present invention provide systems and methods for facilitating communication between wireless access points (WAPs) and mobile devices, thus enhancing user experience. Specifically, embodiments of the present invention reduce the technical burden on the user by allowing the user to connect their mobile device to a WAP simply by using their device to scan a barcode on the WAP, to take a picture of a barcode or printed number on the WAP, or to enter the digits of a printed number on the WAP. The mobile device may include software that automatically obtains digits that are encoded by the barcode, recognizes the digits of the printed number, or otherwise receives the entered digits, and transmits the image or the digits to the WAP as part of a protocol for establishing secure communication with the WAP. Specifically, the software may use such information to determine the ESSID and credential of the WAP, and to automatically configure the mobile device to establish a wireless connection with the WAP based on them and on the transmitted image or digits, and/or may use the image or digits as a credential to establish to the WAP that the mobile device is authorized to securely connect to the WAP. For example, the mobile device may locally store the ESSIDs and credentials of many WAPs, and may use the image or digits to select a particular ESSID-credential pair for that WAP, and to configure the mobile device to connect to the WAP using that pair. Alternatively, the mobile device may send the image or digits to a remote server, which returns the ESSID-credential pair for the selected WAP, which the mobile device may automatically configure itself to use to connect to the WAP in combination with the transmitted picture and/or digits. In either case, the mobile device additionally may transmit the image or digits to the WAP, which the WAP may use to authenticate the mobile device so as to establish a secure connection. The software used by the mobile device conveniently may be downloaded to the mobile device from an online store.

Under one aspect of the present invention, a system is provided for establishing a secure connection to a mobile device that has a processor and a non-volatile computer readable medium. The system may include a wireless access point having an identifier disposed thereon, and a communication application stored in the non-volatile computer readable medium of the mobile device. The communication application may be configured to cause the processor of the mobile device to perform the steps of: (a) obtaining a digital representation of the identifier of the wireless access point; (b) connecting to the wireless access point; (c) transmitting the digital representation of the identifier to the wireless access point; (d) receiving from the wireless access point an ESSID and a credential responsive to the transmitted digital representation; and (e) securely connecting to the wireless access point based on the ESSID and credential.

In some embodiments, the system further includes a plurality of configuration parameters stored in the non-volatile computer readable medium and associated with a corresponding plurality of identifiers for a corresponding plurality of wireless access points. The communication application may be configured to cause the processor of the mobile device to perform the additional step of: (f) selecting a stored configuration parameter based on the digital representation of the identifier. The communication application may be configured to cause the processor of the mobile device to connect to the wireless access point in step (b) further based on the selected configuration parameter. The selected configuration parameter may include at least one of an ESSID and a credential. For example, the selected configuration parameter may include a first ESSID and first and second credentials, and the communication application may be configured to cause the processor of the mobile device to connect to the wireless access point in step (b) further based on the selected configuration parameter by performing the steps of: (f) transmitting the first ESSID and the first credential to the wireless access point to establish a guest connection to the wireless access point; and (g) using the second credential to establish a secure sockets layer/secure shell (SSL/SSH) connection to the wireless access point via the guest connection.

In other embodiments, the system further includes a verification server that stores a configuration parameter associated with the identifier, and the communication application may be configured to cause the processor of the mobile device to perform the steps of: (e) transmitting the digital representation of the identifier to the verification server; and (f) receiving from the verification server a configuration parameter associated with the identifier. The communication application may be configured to cause the processor of the mobile device to connect to the wireless access point in step (b) further based on the received configuration parameter. The received configuration parameter may include at least one of an ESSID and a credential. The verification server may be configured to store the plurality of configuration parameters in a look-up table on a computer-readable medium. The received configuration parameter comprises a first ESSID and first and second credentials, and the communication application may be configured to cause the processor of the mobile device to connect to the wireless access point in step (b) further based on the received configuration parameter by performing the steps of: (h) transmitting the first ESSID and the first credential to the wireless access point to establish a guest connection to the wireless access point; and (i) using the second credential to establish a secure sockets layer/secure shell (SSL/SSH) connection to the wireless access point via the guest connection.

In some embodiments, the identifier includes a bar code identifying the access point, and the communication application may be configured to cause the processor to obtain the digital representation of the identifier by scanning the bar code and converting the scanned bar code into digits. In some embodiments, the identifier includes a printed number identifying the access point, and the communication application may be configured to cause the processor to obtain the digital representation of the identifier by obtaining an image of the printed number and recognizing the digits of the printed number from the image. In some embodiments, the identifier includes a printed number identifying the access point, and the communication application may be configured to cause the processor to obtain the digital representation of the identifier by receiving user input of the digits of the printed number.

Under another aspect, a mobile device-implemented method is provided for facilitating communication between the mobile device and a wireless access point. The method may include: (a) obtaining a digital representation of an identifier disposed on the wireless access point; (b) connecting to the wireless access point; (c) transmitting the digital representation of the identifier to the wireless access point; (d) receiving from the wireless access point an ESSID and a credential responsive to the transmitted digital representation; and (e) connecting to the wireless access point based on the ESSID and credential.

Under another aspect, a verification server-implemented method is provided for facilitating communication between a mobile device and a wireless access point. The method may include: (a) storing a plurality of configuration parameters associated with a corresponding plurality of wireless access point identifiers; (b) receiving a digital representation of an identifier of a wireless access point from the mobile device; (c) based on the received digital representation of the identifier, selecting a stored configuration parameter of the plurality of stored configuration parameters that corresponds to that identifier; and (d) transmitting the configuration parameter to the mobile device.

Under still another aspect, a system is provided for facilitating communication between a mobile device and a wireless access point, the mobile device comprising a processor and a non-volatile computer readable medium. The system may include an identifier disposed on the wireless access point; a plurality of configuration parameters stored in the non-volatile computer readable medium and associated with a corresponding plurality of identifiers for a corresponding plurality of wireless access points; and a communication application stored in the non-volatile computer readable medium. The communication application may be configured to cause the processor of the mobile device to perform the steps of: obtaining a digital representation of the identifier of the wireless access point; based on the digital representation of the identifier, selecting a stored configuration parameter associated with that identifier; and connecting to the wireless access point based on the configuration parameter.

Under another aspect, a mobile device-implemented method is provided for facilitating communication between the mobile device and a wireless access point. The method may include storing a plurality of configuration parameters associated with a corresponding plurality of wireless access point identifiers; obtaining a digital representation of an identifier disposed on the wireless access point; based on the obtained digital representation of the identifier, selecting a stored configuration parameter of the plurality of stored configuration parameters that corresponds to that identifier; and connecting to the wireless access point based on the received configuration parameter.

Under still another aspect, a system is provided for facilitating communication between a mobile device and a wireless access point, the mobile device comprising a processor and a non-volatile computer readable medium and being connected to a first network, the wireless access point being connected to a second network. The system may include an identifier disposed on the wireless access point; a verification server connected to the first network, the verification server storing a configuration parameter associated with the identifier; and a communication application stored in the non-volatile computer readable medium of the mobile device. The communication application may be configured to cause the processor of the mobile device to perform the steps of obtaining a digital representation of the identifier; transmitting the digital representation of the identifier to the verification server via the first network; receiving from the verification server via the first network a configuration parameter associated with the identifier; connecting to the wireless access point based on the received configuration parameter; and connecting to the second network via the wireless access point.

Under yet another aspect, a mobile device-implemented method is provided for facilitating communication between the mobile device and a wireless access point, the mobile device being connected to a first network and the wireless access point being connected to a second network. The method may include obtaining a digital representation of an identifier disposed on the wireless access point; transmitting the digital representation to a verification server via the first network; receiving a configuration parameter associated with the identifier; connecting to the wireless access point based on the received configuration parameter; and connecting to the second network via the wireless access point.

Under still another aspect, a verification server-implemented method is provided for facilitating communication between a mobile device and a wireless access point. The method may include storing a plurality of configuration parameters associated with a corresponding plurality of wireless access point identifiers; receiving a digital representation of an identifier of a wireless access point from the mobile device; based on the received digital representation of the identifier, selecting a stored configuration parameter of the plurality of stored configuration parameters that corresponds to that identifier; and transmitting the selected configuration parameter to the mobile device.

Under yet another aspect, a wireless access point-implemented method is provided for establishing a secure wireless connection to a mobile device. The method may include (a) providing an identifier disposed on the wireless access point; (b) connecting to the mobile device; (c) receiving a digital representation of the identifier from the mobile device; (d) transmitting an ESSID and a credential to the mobile device responsive to the received digital representation of the identifier; and (e) securely connecting to the mobile device based on the ESSID and the credential.

BRIEF DESCRIPTION OF DRAWINGS

FIG. 2A illustrates a steps executed by a mobile device during a method for facilitating communication between the mobile device and a wireless access point based on a digital representation of an identifier disposed on the wireless access point, according to some embodiments of the present invention.

FIG. 2B illustrates a steps executed by a wireless access point during a method for facilitating communication between the mobile device and a wireless access point based on a digital representation of an identifier disposed on the wireless access point, according to some embodiments of the present invention.

FIG. 5 illustrates a look up table that may be used by a system for facilitating communication between a mobile device and a wireless access point, according to some embodiments of the present invention.

FIG. 6 illustrates steps executed by a mobile device during a method for facilitating communication between the mobile device and a wireless access point based on locally stored configuration parameters, according to some embodiments of the present invention.

FIG. 10 illustrates steps in a method executed by a verification server for facilitating communication between a mobile device and a wireless access point based on remotely stored configuration parameters, according to some embodiments of the present invention.

DETAILED DESCRIPTION

Embodiments of the present invention provide systems and methods for facilitating communication between mobile devices and wireless access points. Specifically, the present systems and methods automatically establish a connection between the mobile device and the wireless access point without requiring the mobile device's user to know any technical details that otherwise may be needed to suitably configure the mobile device. Instead, the wireless access point includes an identifier, e.g., a printed label including a barcode and/or a printed number, disposed thereon. A communication application being executed by the mobile device is configured to obtain a digital representation of the identifier, e.g., by scanning the barcode, or by obtaining an image of the printed number and recognizing the digits of the printed number from the image, and to use that digital representation to establish a connection between the mobile device and the wireless access point, without the need for further user intervention. In particular, the application may transmit the digital representation of the identifier to the wireless access point as a credential for authenticating the mobile device to the wireless access point. By comparison, previously known methods of establishing communication between a mobile device and a wireless access point may require the user to determine the ESSID of the wireless access point, initiate a connection to the wireless access point, and obtain and then manually enter any needed login credentials. Accordingly, the present systems and methods may significantly reduce the burden on the user, and as such may improve the user's experience.

A first embodiment system for facilitating communication between a mobile device and a selected wireless access point, and methods and signaling protocols associated with same, will be described. Then, alternative systems, methods, and signaling protocols will be described.

Figure 1:
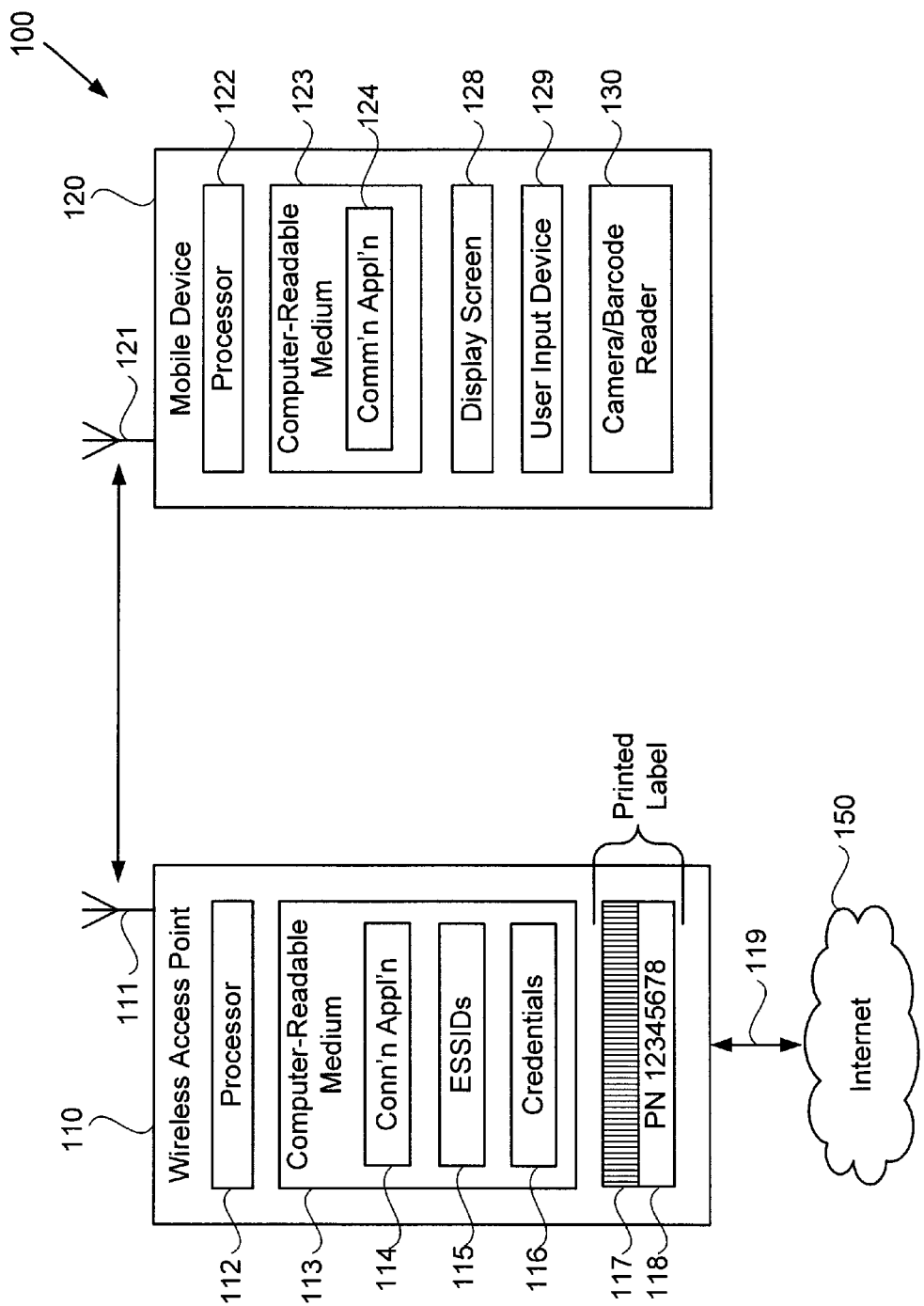
FIG. 1 illustrates a system for facilitating communication between a mobile device and a wireless access point based on a digital representation of an identifier disposed on the wireless access point, according to some embodiments of the present invention.

FIG. 1 illustrates system 100 for facilitating communication between a mobile device and a selected wireless access point, according to some embodiments of the present invention. System 100 includes wireless access point-1 (WAP-1) 110 and mobile device 120.

WAP 110 may include antenna 111, processor 112, non-volatile computer-readable medium 113, and an identifier disposed on WAP, e.g., a printed label including a barcode 117 and a printed number 118 that identify the WAP, preferably uniquely. WAP 110 may be connected via port 119 to Internet 150. For example, in some embodiments port 119 includes a modem, such as a fiber modem, DSL modem, or VDSL modem, that facilitates connection between WAP 110 and Internet 150 via appropriate cabling. In other embodiments, WAP 110 is a router or gateway lacking modem functionality and instead is configured to connect directly to Internet 150 e.g., via port 119 and an Ethernet cable (not illustrated).

Preferably, WAP 110 is configured to allow wireless devices connected thereto to access Internet 150 via antenna 111 and port 119 upon exchange of suitable credentials. Antenna 111 may include a transceiver (not illustrated) and may be configured to receive radio frequency (RF) signals from mobile devices such as mobile device 120, and to communicate a digital representation of such signals to processor 112; and to receive digital signals from processor 112 and to transmit RF representations of those signals to mobile devices such as mobile device 120. Port 119 may be configured to receive digital signals from Internet 150, and to communicate those signals to processor 112; and to transmit digital signals from processor 112 to Internet 150. Computer-readable medium 113 of WAP 110 may include an internal or external memory device, such as FLASH, RAM, ROM, EPROM, EEPROM, or a magnetic or optical disk or tape.

Computer-readable medium 113 of WAP 110 is configured to store connection application ("conn'n appl'n") 114, as well as one or more configuration parameters for WAP 110, e.g., one or more ESSIDs 115, and one or more credentials 116. As described in greater detail below with reference to FIG. 3, credentials 116 may include a plurality of different credentials that mobile device 120 may use to establish a connection to WAP 110, such as a user name and password, an encryption key, and the like. ESSIDs 115 and credentials 116 may be recorded by the WAP provider when the WAP is manufactured, or may be assigned at a later time.

Mobile device 120 includes antenna 121, processor 122, computer-readable medium 123, display screen 128, user input device 129, and camera/barcode reader 130. Computer-readable medium 123 of mobile device 120 may include an internal or external memory device, such as FLASH, RAM, ROM, EPROM, EEPROM, or a magnetic or optical disk or tape. Computer-readable medium 123 of mobile device 120 is configured to store communication application ("comm'n appl'n") 124. Communication application 124 is configured to obtain a digital representation of the identifier(s) 117, 118 disposed on WAP 110 using user input device 129 and/or camera/barcode reader 130, to transmit such digital representation to WAP 110, and to automatically connect mobile device 120 to WAP 110 based on the transmitted digital representation.

Specifically, the user of mobile device 120 may wish to wirelessly connect the mobile device to WAP 110 so as to wirelessly access Internet 150 via antenna 121 of mobile device 120 and antenna 111 and port 119 of WAP 110, but may not wish to and/or may not know how to manually configure mobile device 120 so as to establish such a connection. In many regards, WAP 110 and mobile device 120 may be otherwise "off-the-shelf," commercially available components that are modified so as to include features that facilitate an automatic connection between WAP 110 and mobile device 120. For example, WAP 110 may be a commercially available fiber optic modem router, a DSL or VDSL modem router, or any other suitable gateway or router that may be connected to Internet 150 and may provide a wireless connection between a device and Internet 150. However, in the illustrated embodiment, WAP 110 is configured to include thereon information identifying the WAP, e.g., a printed label that includes barcode 117 and/or printed number 118, that may be used to facilitate communication between WAP 110 and a mobile device. WAP 110 also is configured to store in computer-readable medium 113 connection application 114, ESSIDs 115, and credentials 116, with connection application 114 being configured to establish a connection with mobile device 120 via a protocol for exchanging those credentials such as described below with reference to FIG. 3.

Analogously, mobile device 120 may be a commercially available smartphone, such as an iPhone, Android-based phone, BlackBerry, or Windows-based phone, or another suitable device that may wirelessly connect to a wireless access point, such as a laptop computer, personal digital assistant, iPad, tablet computer, netbook, and the like. However, in the illustrated embodiment, mobile device 120 is configured to store, in computer-readable medium 123, communication application 124 configured to facilitate communication between mobile device 120 and WAP 110 without requiring technical expertise on the part of the mobile device's user.

Referring still to FIG. 1, computer-readable medium 113 of WAP 110 may be configured to store connection application ("conn'n appl'n") 114, one or more extended service set identifications (ESSIDs) 115, and one or more credentials 116. Each of ESSIDs 115 preferably is a sequence of numbers that identifies WAP 110, preferably uniquely, relative to other devices connected to Internet 150. Credentials 116 may include one or more logins (user names), one or more passwords, and one or more encryption keys. As is familiar to those skilled in the art, devices may access wireless access points by specifying an ESSID of that access point and providing an appropriate credential, e.g., an appropriate login and password and/or an encryption key. Certain wireless access points may broadcast one or more of their ESSIDs, so that devices may readily connect to the access points given the proper credential for the corresponding ESSID. One or more of such broadcast ESSIDs may be a "guest" ESSID via which a device may establish an unsecured connection to WAP 110. As described in greater detail below with reference to FIGS. 2-3, WAP 110 and mobile device 120 may establish such an unsecured connection with one another, via which the mobile device may transmit the digital representation of the identifier to the WAP for use in establishing a secured connection with the WAP. WAP 110 preferably only connects securely with devices that transmit to WAP 110 a digital representation of the identifier on the WAP, and thus reasonably may be assumed to be associated with users who are authorized to connect to WAP 110. Additionally, one or more of ESSIDs 115 optionally may be a "hidden" or "cloaked" ESSID that WAP 110 does not broadcast, but instead transmits only to mobile devices from which it has received a digital representation of the identifier. Connection application 114 may be configured to cause processor 112 of WAP 110 to receive signals from mobile device 120 via antenna 111 using a wireless protocol such as an IEEE 802.11 protocol, and to permit WAP 110 to securely connect to, and permit secure bi-directional communication with, that mobile device only if the signals received from the mobile device include the digital representation of an identifier disposed on WAP 110. An exemplary method and protocol for establishing such a connection is described further below with reference to FIGS. 2-3.

Computer-readable medium 123 of mobile device 120 is configured to store communication application ("comm'n appl'n") 124, which is configured to work with native applications on mobile device 120 to display output using display screen 128, to receive input using user input device 129, to obtain images and/or scan barcodes using camera/barcode reader 130, and to communicate with wireless access points such as WAP 110 via antenna 121. In preferred embodiments, the mobile device's user may download communication application 124 into computer-readable medium 123 from an online application store, such as the Apple App Store/iTunes, the Google Play store, the Windows Marketplace, or the BlackBerry App World, as appropriate for the particular model and operating system of mobile device 120. Communication application 124 is configured to cause processor 122 of mobile device 120 to automatically perform a series of steps that establish a connection between WAP-1 and mobile device 120 without requiring the user to manually configure mobile device 120.

Specifically, communication application 124 is configured to respond to a user's indication that the user wishes to connect to WAP 110. For example, via display screen 128 and user input device 129, the user may open communication application 124 and indicate that the user wishes to initiate a network connection. The communication application 124 causes the processor to display on display screen 128 a region prompting the user to input the identifier disposed on the wireless access point to which the user wishes to connect, in this example WAP 110. In some embodiments, the displayed region prompts the user to scan barcode 117 on WAP 110, e.g., by displaying a window prompting the user to position the mobile device 120 such that the barcode is within view of camera/barcode reader 130, and a button allowing the user to provide input causing camera/barcode reader 130 to scan the barcode so as to obtain a digital representation of the barcode. In other embodiments, the displayed region prompts the user to obtain an image of barcode 117 and/or printed number 118, e.g., by displaying a window prompting the user to position the mobile device 120 such that the barcode 117 and/or printed number 118 are within view of camera/barcode reader 130, and a button allowing the user to provide input causing camera/barcode reader 130 to obtain an image of the barcode and/or printed number and so to obtain a digital representation of the barcode and/or printed number. Optionally, responsive to such user input, communication application 124 further causes processor 122 to analyze the image so as to extract the barcode and/or the digits of the printed-number so as to obtain a digital representation of the barcode and/or printed number. In still other embodiments, communication application 124 is configured to prompt the user to input the digits of printed number 118 using user input device 129 of mobile device 120 so as to obtain a digital representation of the printed number.

Communication application 124 is configured to connect to WAP 110 based on the digital representation of the identifier disposed on the WAP, e.g., based on the digits of barcode 117 and/or based on the digits of printed number 118. For example, as described below with reference to FIGS. 2-3, communication application 124 of mobile device 120 may first connect to WAP 110 via an unsecured, "guest" connection, and then may establish an SSL/SSH connection via which the mobile device may transmit the digital representation of the identifier to the WAP. Responsive to that transmission, connection application 114 may securely connect to mobile device 120, e.g., by providing an ESSID and credential that mobile device 120 may use to establish a secure wireless connection to WAP 110. Or, for example, as described further below with reference to FIGS. 4-7, the mobile device further may store configuration parameters and identifiers associated with respective wireless access points. The mobile device may identify which of the stored configuration parameters are associated with the WAP based on the digital representation of the identifier, and may use such identified configuration parameter together with the digital representation of the identifier to securely connect to the WAP. Alternatively, as described further below with reference to FIGS. 8-10, the mobile device may transmit the digital representation of the identifier to a remote verification server, which in response transmits to the mobile device configuration parameters that may be used together with the digital representation of the identifier to securely connect to the WAP.

In the embodiment illustrated in FIG. 1, communication application 124 is configured to securely connect mobile device 120 to WAP 110 first by establishing an unsecured connection, e.g., a "guest" connection, to the WAP. For example, one of ESSIDs 115 may be a "guest" ESSID, and WAP 110 may be configured to broadcast that guest ESSID and allow devices to nonsecurely connect to the WAP via that ESSID. Communication application 124 may be configured to select the guest ESSID either automatically, or by providing an interface via which the user may select the guest ESSID for WAP 110. Communication application 124 may be configured to cause mobile device 120 to wirelessly transmit the digital representation of the identifier to WAP 110 via antenna 121 using an appropriate signaling protocol, such as a WiFi protocol.

Communication application 124 may be configured to formulate and transmit, via the unsecured connection, appropriate commands that contain the digital representation of the identifier and a request to connect securely. For example, connection application 114 of WAP 110 may establish a secure sockets layer/secure shell (SSL/SSH) connection with communication application 123 of mobile device 120, via which connection application 114 and mobile device 120 may exchange credentials—including the digital representation of the identifier—to establish a secure connection. An exemplary signaling protocol for establishing such a connection is described further below with reference to FIG. 3.

FIG. 2A illustrates steps in a mobile device-implemented method 200 of securely connecting to a selected wireless access point, e.g., establishing a secure connection between mobile device 120 and WAP 110 illustrated in FIG. 1.

Method 200 illustrated in FIG. 2A includes obtaining a digital representation of an identifier disposed on a selected wireless access point at the mobile device (step 210). For example, responsive to a user's input indicating that the user wishes to connect mobile device 120 to WAP 110, communication application 124 illustrated in FIG. 1 may be configured to prompt the user to scan barcode 117 disposed on the WAP using camera/barcode reader 130 (step 211 of method 200), to obtain an image of barcode 117 and/or of printed number 118 disposed on the WAP using camera/barcode reader 130 (step 212 of method 200), and/or to enter the digits of printed number 118 using user input device 129 (step 213 of method 200). Communication application 124 optionally may further process any images so obtained, e.g., to extract and recognize the barcode and/or digits of the printed number, as described above.

Referring again to FIG. 2A, method 200 also includes connecting to the selected wireless access point (step 220). For example, as mentioned above with reference to FIG. 1 and described in greater detail below with reference to FIG. 3, communication application 124 of mobile device 120 may be configured to establish an unsecured "guest" connection to WAP 110, which then may be used to establish an SSL/SSH connection via which the digital representation of the identifier may be transmitted. Other embodiments are described in greater detail below with reference to FIGS. 4-10.

As illustrated in FIG. 2A, method 200 further includes transmitting the digital representation of the identifier to the wireless access point (step 230) and receiving an ESSID and credential from the wireless access point responsive to the transmitted digital representation (step 240). The mobile device then may securely connect to the wireless access point based on the ESSID and credential (step 250). For example, as mentioned above with reference to FIG. 1 and described in greater detail below with reference to FIG. 3, WAP 110 may establish secure bidirectional communication with mobile device 120 responsive to receipt of the digital representation by transmitting an ESSID and a credential to the mobile device, which the mobile device then may use to establish the secure connection. Other embodiments are described in greater detail below with reference to FIGS. 4-10.

FIG. 2B illustrates steps in a wireless access point-implemented method 200' of securely connecting to a mobile device, e.g., establishing a secure connection between mobile device 120 and WAP 110 illustrated in FIG. 1.

Method 200' illustrated in FIG. 2B includes providing a identifier disposed on a wireless access point (step 260). For example, WAP 110 illustrated in FIG. 1 may include barcode 117 and/or printed number 118 disposed on thereon.

Referring again to FIG. 2B, method 200' also includes connecting to the mobile device (step 270). For example, as mentioned above with reference to FIGS. 1 and 2A and described in greater detail below with reference to FIG. 3, communication application 124 of mobile device 120 may be configured to establish an unsecured "guest" connection to WAP 110, via which an SSL/SSH connection then may be established via which the digital representation of the identifier may be transmitted to the wireless access point. Other embodiments are described in greater detail below with reference to FIGS. 4-10.

As illustrated in FIG. 2B, method 200' further includes receiving the digital representation of the identifier from the mobile device (step 280), e.g. the digits of a barcode (step 281), an image of a barcode or printed number (step 282), or digits of a printed number (step 283), and transmitting an ESSID and credential to the mobile device responsive to the transmitted digital representation (step 290). The wireless access point then may securely connect to the mobile device based on the ESSID and credential (step 300). For example, as mentioned above with reference to FIGS. 1 and 2A and described in greater detail below with reference to FIG. 3, WAP 110 may establish secure bidirectional communication with mobile device 120 responsive to receipt of the digital representation by transmitting an ESSID and a credential to the mobile device, which the mobile device then may use to establish the secure connection. Other embodiments are described in greater detail below with reference to FIGS. 4-10.

Figure 3:
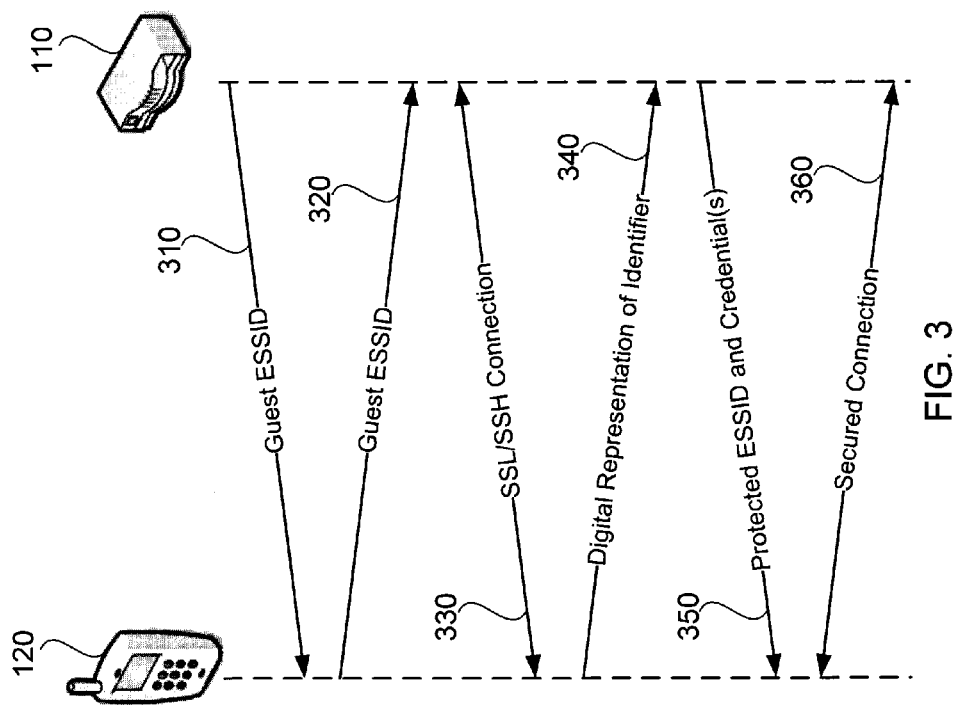
FIG. 3 illustrates a signaling protocol that may be implemented by the system illustrated in FIG. 1 during execution of the method illustrated in FIGS. 2A-2B, according to some embodiments of the present invention.

FIG. 3 illustrates steps in a signaling protocol that mobile device 120 may use to establish secure bidirectional communication with WAP 110 based on transmission of a digital representation of an identifier to a the WAP, e.g., steps 220 and 230 of method 200 illustrated in FIG. 2A.

During such a protocol, mobile device 120 first may initiate a connection to WAP 110 as a "guest." In the embodiment illustrated in FIG. 3, WAP 110 broadcasts a guest ESSID that is received by mobile device 120 (as well as other mobile devices within broadcasting range of WAP 110) (step 310). Mobile device 120 initiates an unsecured connection to WAP 110 by transmitting the guest ESSID back to WAP 110 (step 320). Establishing such a connection may include bidirectional handshaking as is known in the art (not illustrated). WAP 110 then may initiate an SSL/SSH connection with mobile device 120, which may include transferring one or more credentials to the mobile device and/or bidirectional handshaking (step 330). Mobile device 120 then transmits the digital representation of the identifier to WAP 110 via the SSL/SSH connection (step 340). WAP-1 110 may use the received digital representation to verify that that mobile device 120 is a trusted device. In this regard, the digital representation may function as a type of "password" or credential, e.g., to inhibit mismatching if two routers are placed close to one another, or to inhibit malicious behavior such as if a user were to post a barcode image online and make one or more other credentials public information. Responsive to such transmission, WAP 110 then may transfer to mobile device a protected ESSID and one or more credentials (step 350). Preferably, the protected ESSID provided in step 350 is different than the guest ESSID broadcast in step 310. Additionally, one or more of ESSIDs 115 optionally may be a "hidden" or "cloaked" ESSID that WAP 110 does not broadcast, but instead transmits only to mobile devices from which it has received a digital representation of the identifier. The credentials may include, for example, an encryption key that mobile device 120 may use to securely connect to WAP 110 using the protected ESSID, and/or a login and password. Mobile device 120 and WAP 110 then may communicate securely with one another in step 360.

Figure 4:
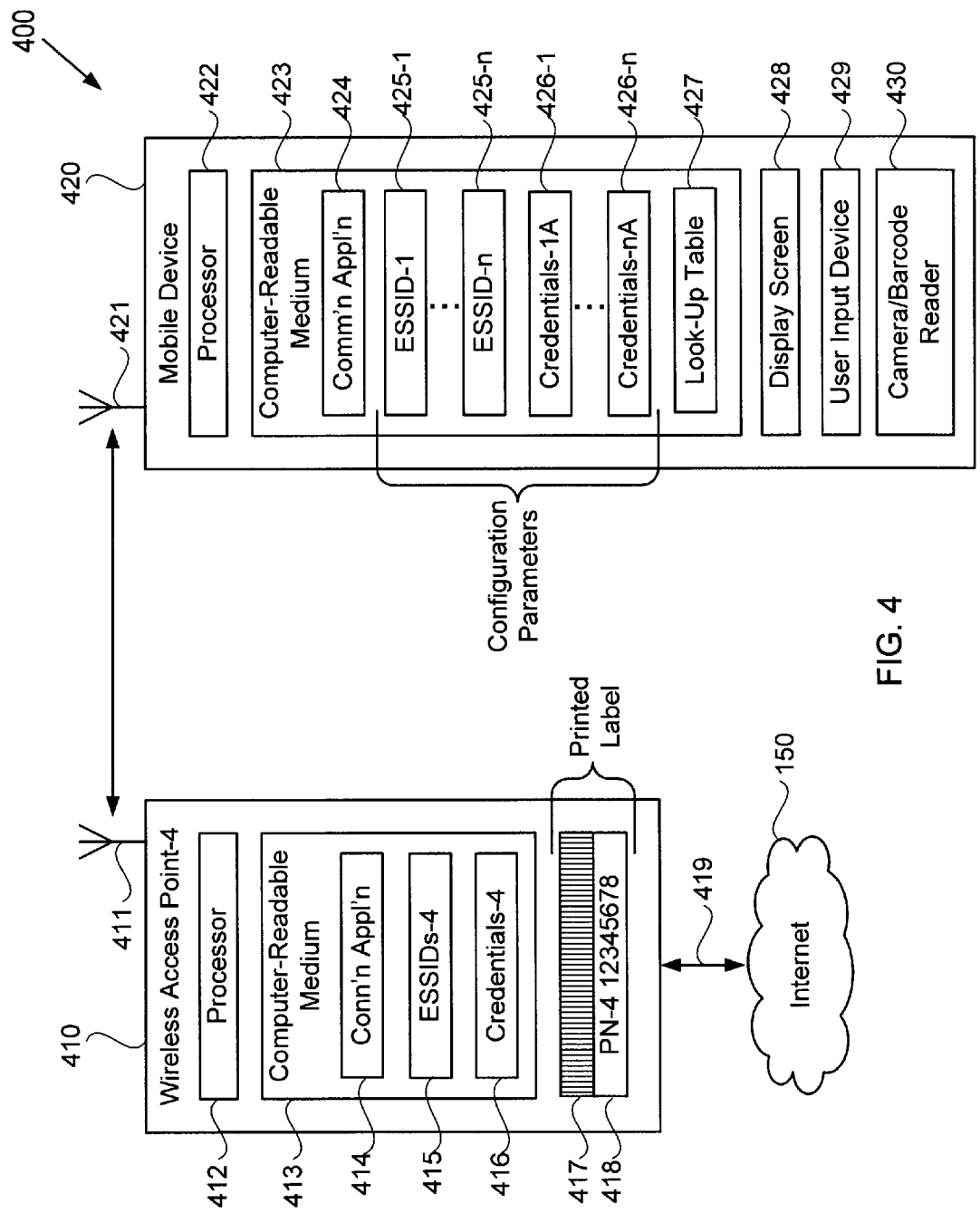
FIG. 4 illustrates a system for facilitating communication between a mobile device and a wireless access point based on a digital representation of an identifier disposed on the wireless access point and on locally stored configuration parameters, according to some embodiments of the present invention.

In some embodiments, the mobile device may locally store configuration parameters that may be used to connect to WAP. For example, FIG. 4 illustrates system 400 for facilitating communication between mobile device 420 and WAP-4 410 based on a digital representation of an identifier disposed on WAP-4 and on configuration parameters that are stored locally at mobile device 420.

WAP-4 410 may be configured similarly to WAP 110 described above with reference to FIG. 1, e.g., may include antenna 411, processor 412, non-volatile computer-readable medium 413, and an identifier disposed on WAP-4, e.g., a printed label including barcode-4 417 and printed number-4 (PN-4) 418 that identify WAP-4, preferably uniquely. WAP-1 110 is connected via port 419 to Internet 150, and is configured to allow wireless devices connected thereto to access Internet 150 via antenna 411 and port 419 upon exchange of suitable credentials. Computer-readable medium 413 of WAP-4 410 is configured to store connection application ("conn'n appl'n") 114, as well as a configuration parameter for WAP-4 410, e.g., one or more ESSIDs-4 415, and one or more credentials-4 416. As described in greater detail below with reference to FIG. 7, credentials-4 416 may include a plurality of different credentials that mobile device 420 may use to establish a connection to WAP-4 410, such as one or more user names, passwords, encryption keys, and the like. Preferably, ESSIDs-4 415 and credentials-4 416 are recorded by the WAP provider when WAP-4 410 is manufactured, and ESSIDs-4 415 and some or all of credentials-4 416, or credentials that are complementary to credentials-4 416, are subsequently provided to computer-readable medium 423 of mobile device 420.

Mobile device 420 is in many ways configured analogously to mobile device 120 described above with reference to FIG. 1. Mobile device 420 includes antenna 421, processor 422, computer-readable medium 423, display screen 428, user input device 429, and camera/barcode reader 430. Computer-readable medium 423 of mobile device 420 of mobile device 420 is configured to store communication application ("comm'n appl'n") 424, as well as configuration parameters for a plurality of wireless access points, including WAP-4 410. For example, in the illustrated embodiment, the configuration parameters include n ESSIDs respectively associated with n wireless access points, e.g., ESSIDs-1 . . . ESSIDs-n 425-1 . . . 425-n, including ESSIDs-4 425-4 associated with WAP-4 410 (not explicitly shown in FIG. 4). The configuration parameters also may include n credentials for those wireless access points, e.g., credentials-1A . . . credentials-nA 426-1 . . . 426-n, including credentials-4A 426-4 associated with WAP-4 410 (not explicitly shown in FIG. 4). Computer-readable medium 423 further may store a look-up table 427 or other data structure that associates such configuration parameters with identifiers for corresponding wireless access points, as described in greater detail below with reference to FIG. 5. Note that the that credentials-4A 426-4 stored in mobile device 420 may include only a subset of the credentials within credentials-4 416 stored in WAP-4 410, or may in some cases be complementary to such credentials. Communication application 424 is configured to obtain a digital representation of the identifier(s) 417, 418 disposed on WAP-4 410 using user input device 429 and/or camera/barcode reader 430, to automatically use such digital representation to select the configuration parameter for WAP-4 from computer-readable medium 423, e.g., using look-up table 427, and to automatically connect mobile device 420 to WAP-4 based on that selected configuration parameter and on a transmission of the digital representation to WAP-4.

In preferred embodiments, the mobile device's user may download components 424-427 into computer-readable medium 423 from an online application store, such as the Apple App Store/iTunes, the Google Play store, the Windows Marketplace, or the BlackBerry App World, as appropriate for the particular model and operating system of mobile device 420.

Communication application 424 is configured to cause processor 422 of mobile device 420 to automatically perform a series of steps that establish a connection between WAP-4 410 and mobile device 420 without requiring the user to manually configure mobile device 420, including obtaining a digital representation of the identifier disposed on WAP-4 410, responsive to user input such as described above with reference to FIG. 1. Specifically, communication application 424 is configured to select one of the configuration parameters stored in computer-readable medium 423 based on the digital representation of the identifier disposed on WAP-4 410, e.g., based on the digits or image of barcode-4 417 and/or based on the digits or image of printed number-4 418, and to connect to WAP-4 based on the selected configuration parameter.

For example, referring now to FIG. 5, in some embodiments the configuration parameters and identifiers associated with a respective wireless access point may be stored in a look-up table 427, which may be stored in computer-readable medium 423 of mobile device 420. For example, table 427 may include a first column 510 that contains digital representations of identifiers associated with respective wireless access points, e.g., the digits or image of a barcode disposed on each wireless access point. Table 427 also may include a second column 520 that lists the serial numbers (or other, preferably unique, identifier) of the wireless access points respectively associated with those digital representations. Table 427 also may include a third column 530 that contains pointers to the configuration parameters associated with the respective digital representations of the identifier and the serial number of the wireless access points, such as the ESSID and credentials for use in respectively establishing communication with each of the WAPs.

Communication application 424 may be configured to identify and select a stored configuration parameter associated with the identifier disposed on a selected wireless access point, here WAP-4 410, by first comparing the digital representation of that identifier to the digital representations stored in first column 510 of look-up table 427. For example, communication application 424 may compare the received digits or image of barcode-4 417 and/or the received digits or image of printed number-4 (PN-4) 418 to the contents of first column 510 of table 427. If communication application 424 identifies a stored digital representation that matches the digital representation of the identifier disposed on WAP-4 410, e.g., if communication application 424 determines that the stored image and/or digits of barcode -1 . . . barcode-n and/or of printed number-1 (PN-1) . . . printed number-n (PN-n) matches that of WAP-4 410, then communication application 124 selects the row 540-1 . . . 540-n of that matching image and/or digits as corresponding to the wireless access point to which the mobile device's user wishes to connect. Communication application 424 then may select the serial number of the associated wireless access point based on the contents of the second column 520 of look-up table 427 in the selected row, and may select a pointer to the configuration parameter (e.g., one or more ESSIDs and one or more credentials) for that wireless access point based on the contents of the third column 530 of look-up table 427 in the selected row. Note that the credentials stored in table 427 of mobile device 420 may include only some of the credentials that may be required to establish bi-directional communication between the mobile device and WAP-4 410, and that WAP-4 410 may provide other of such credentials to the mobile device following sufficient authentication, as described in greater detail below with reference to FIG. 7. Additionally, note that the column listing the serial numbers (or other wireless access point identifiers) may be optionally omitted, as the digital representation of the identifier in the first column may be associated directly with a respective configuration parameter, without the need to identify the serial number of the associated wireless access point. Additionally, note that look-up table 427 may store the configuration parameters themselves, or alternatively may store pointers to configuration parameters that are stored separately, e.g., elsewhere in computer-readable medium 423 of mobile device 420.

Referring again to FIG. 4, communication application 424 is configured to obtain the configuration parameter for the selected wireless access point, here WAP-4 410, based on the selected pointer to the configuration parameter associated with that wireless access point, here the pointers to configuration parameter ESSIDs-4 425-4 and credentials-4A 426-4 stored in computer readable medium 423. Communication application 424 is configured to automatically connect mobile device 420 to WAP-4 410 by suitably configuring the mobile device to send one or more of the selected configuration parameter, e.g., one or more of ESSIDs-4 425-4 and one or more of credentials-4A 426-4, to WAP-4 using a protocol such as described further below with reference to FIG. 7. For example, in some embodiments, communication application 424 causes mobile device 420 to wirelessly transmit one of ESSIDs-4 425-4 and one or more of the credentials within credentials-4A 426-4 to WAP-4 410 via antenna 421 using an appropriate signaling protocol, e.g., a WiFi protocol.

Communication application 124 may formulate appropriate commands that contain one or more of ESSIDs-4 425-4 and one or more of the credentials within credentials-4A 426-4, and transmit such commands to WAP-4 410 via antenna 421. Connection application 414 of WAP-4 410 is configured to receive such transmitted commands via antenna 411, to compare the one or more ESSIDs-4 425-4 and credentials-4A 426-4 received from mobile device 420 to ESSIDs-4 415 and credentials-4 416 stored in computer-readable medium 413. If the ESSIDs-4 and credentials-4A received from mobile device 420 match (or otherwise correspond to) the ESSIDs-4 and credentials-4 stored in computer-readable medium 413 of WAP-4 410, then connection application 414 establishes a bidirectional communication connection between WAP-4 410 and mobile device 420, e.g., allowing mobile device 420 to access Internet 150 via WAP-4. An exemplary signaling protocol for establishing such a connection is described further below with reference to FIG. 7.

Note that although FIG. 4 illustrates configuration parameters 425-4 . . . 425-n and 426-1 . . . 426-n and look-up table 427 as being separate from communication application 424, communication application 424 instead may be configured to include configuration parameters 425-1 . . . 425-n and 426-1 . . . 426-n and look-up table 427 therein. Also, look-up table 427 is only one example of a structure that communication application 424 may suitably use to identify and select a stored configuration parameter based on a digital representation of the identifier, e.g., printed label, disposed on WAP-4 410.

FIG. 6 illustrates steps in a mobile device-implemented method 600 of facilitating communication between a mobile device and a selected wireless access point, e.g., between mobile device 420 and WAP-4 410 illustrated in FIG. 4.

Method 600 illustrated in FIG. 6 includes storing configuration parameters associated with a plurality of wireless access point identifiers at the mobile device (step 610). For example, computer-readable medium 423 of mobile device 420 may store n ESSIDs respectively associated with n wireless access points, e.g., ESSIDs-1 ... ESSIDs-n 425-1 ... 425-n such as illustrated in FIG. 4 (step 611 of method 600); may store n credentials for those wireless access points, e.g., credentials-1A ... credentials-nA 426-1 ... 426-n (step 612 of method 600); and optionally also may store a look-up table 427 that associates such configuration parameters with identifiers for corresponding wireless access points, as described in greater detail above with reference to FIG. 5. The configuration parameters and the lookup table may be part of, or may be accessed by, a communication application, and may be downloaded separately or together with the communication application from an online store and to mobile device 420, as described in greater detail above. In some embodiments, credentials-1A ... credentials-nA 426-1 ... 426-n may include only a subset of the credentials that may be required to establish bidirectional communication between mobile device 420 and WAP-4 410, and the remaining credentials provided from WAP-4 to the mobile device during a signaling protocol such as described further below with reference to FIG. 7.

As illustrated in FIG. 6, method 600 also includes obtaining a digital representation of an identifier disposed on a selected wireless access point at the mobile device (step 620). For example, responsive to a user's input indicating that the user wishes to connect mobile device 420 to WAP-4 410, communication application 424 illustrated in FIG. 4 may prompt the user to scan barcode-4 417 disposed on WAP-4 using camera/barcode reader 430 (step 621 of method 600), to obtain an image of barcode-4 417 and/or of printed number-4 418 disposed on WAP-4 using camera/barcode reader 430 (step 622 of method 600), and/or to enter the digits of printed number-4 418 using user input device 429 (step 623 of method 600). Communication application 424 optionally may further process any images so obtained, e.g., to extract the barcode and/or digits of the printed number, as described above.

Referring again to FIG. 6, method 600 also includes selecting, at the mobile device, a stored configuration parameter associated with the selected wireless access point based on the digital representation of the identifier disposed on that wireless access point (step 630). For example, as described above with reference to FIGS. 4-5, communication application 424 of mobile device 420 may compare the digital representation of the identifier disposed on the selected wireless access point to a plurality of stored digital representations of identifiers of a corresponding plurality of wireless access points, and may select the configuration parameter corresponding to a matching identifier, e.g., using look-up table 427 stored in computer readable medium 423.

As illustrated in FIG. 6, method 600 further includes connecting the mobile device to the selected wireless access point based on the selected stored configuration parameter and on transmission of the digital representation of the identifier (step 640). For example, as described above with reference to FIG. 4, mobile device 420 may transmit the selected configuration parameter to WAP-4 410, e.g., one or more of ESSIDs-4 425-4 and credentials-4A 426-4, as well as the digital representation of the identifier, responsive to which WAP-4 may securely bidirectionally communicate with the mobile device.

Figure 7:
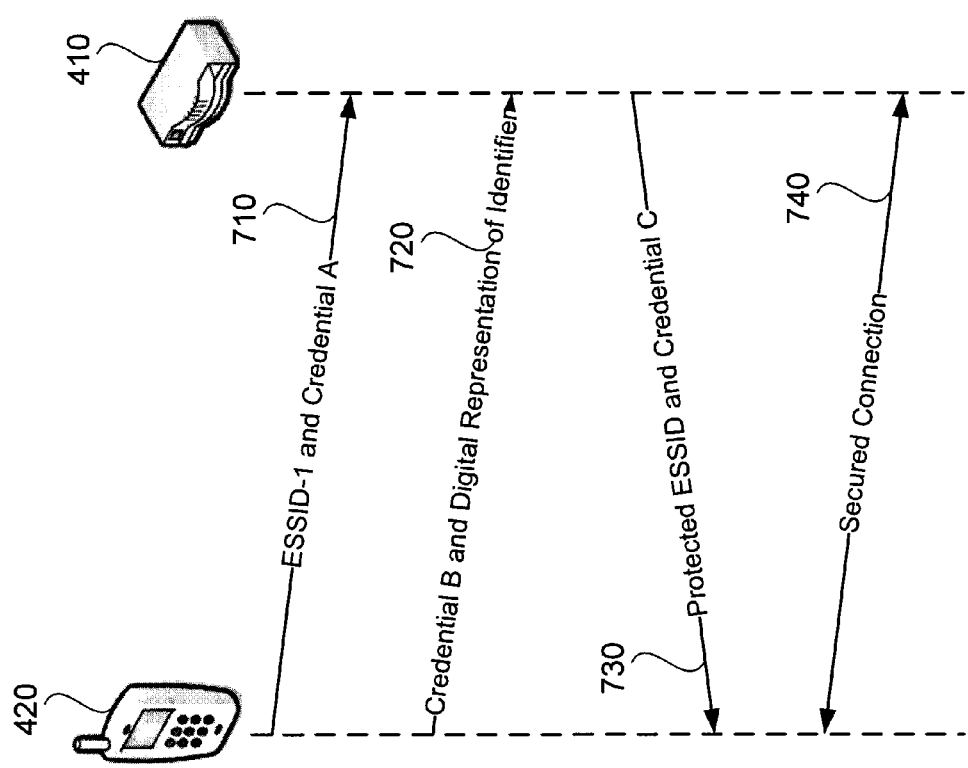
FIG. 7 illustrates a signaling protocol that may be implemented by the system illustrated in FIG. 4 during execution of the method illustrated in FIG. 5, according to some embodiments of the present invention.

FIG. 7 illustrates steps in a signaling protocol that mobile device 420 may use to establish bidirectional communication with WAP-4 410 based on the selected configuration parameter and transmission of the digital representation of the identifier, e.g., during step 640 of method 600 illustrated in FIG. 6. During such a protocol, mobile device 420 first may initiate a connection to WAP-4 410 based on ESSID-1 within ESSIDs-4 425-4 and a first portion of credentials-4A 426-1, referred to in FIG. 7 as "credential A". Specifically, as described above with reference to step 630 of FIG. 6, mobile device 420 may select a locally stored configuration parameter associated with WAP-4 410 based on a digital representation of an identifier disposed on WAP-4. That configuration parameter may include ESSID-1, as well as credential A, which in some embodiments may be an encryption key associated with ESSID-1. As illustrated in FIG. 6, mobile device 420 may transmit ESSID-1 and credential A to WAP-4 410 (step 710). In an alternative embodiment, ESSID-1 is a "guest" ESSID broadcast by WAP-4 410 that mobile device 420 may use to establish an unsecured guest connection in a manner analogous to that described above with reference to steps 310 and 320 of FIG. 3.

Responsive to receipt of ESSID-1 and credential A, WAP-4 may confirm the accuracy of credential A, e.g., by confirming that ESSID-1 received from mobile device 420 matches ESSID-4 415 stored in computer-readable medium 413, and confirming that credential A matches a corresponding credential of credentials-4 416 stored in computer-readable medium 43. Note that WAP-4 410 alternatively may use credential A to authenticate mobile device 420 in any appropriate manner, e.g., by using credential A to decrypt another value stored in credentials-4 416. That is, credential A may be complementary to credentials stored in credentials-4 416, rather than a subset of the credentials stored in credentials-4 416.

Then, mobile device 420 may establish a secured socket layer/secure shell (SSL/SSH) connection with WAP-4 410 based on a second portion of credentials-4A 426-4, referred to in FIG. 7 as "credential B," as well as on the digital representation of the identifier disposed on WAP-4 (step 720). Credential B may include, for example, an SSL/SSH certificate evidencing authenticity of mobile device 420, and/or a login (user name) and password. Mobile device 420 transmits credential B to WAP-4 410, responsive to which WAP-1 may determine whether credential B matches (or complements) credentials stored in credentials-1 116, e.g., if credential B sufficiently authenticates mobile device 420, and if so then opens an SSL/SSH connection to mobile device 420. Concurrently or sequentially with credential B, mobile device 420 also may transmit the digital representation of the identifier disposed on WAP-4 440. Preferably, such transmission occurs after the SSL/SSH connection is established, but optionally may be before such connection is established. WAP-4 410 may use the received digital representation to verify that that mobile device 420 is a trusted device. In this regard, the digital representation may function as a type of "password."

Then, if WAP-4 410 determines that credential B and the transmitted digital identifier sufficiently authenticate mobile device 420, WAP-4 410 may transmit to mobile device 120, via the SSL/SSH connection, a protected ESSID and a portion of credentials-4 416, referred to in FIG. 7 as "credential C" (step 730). The protected ESSID preferably is a different ESSID of WAP-4 410 than is ESSID-1. Optionally, the protected ESSID may be a "hidden" or "cloaked" ESSID that WAP-4 410 does not broadcast, but instead transmits only to mobile devices from which it has received a digital representation of the identifier. Credential C may include, for example, an encryption key that mobile device 420 may use to securely connect to WAP-4 410 using the protected ESSID. Mobile device 420 and WAP-4 410 then may communicate securely with one another in step 740.

Figure 8:
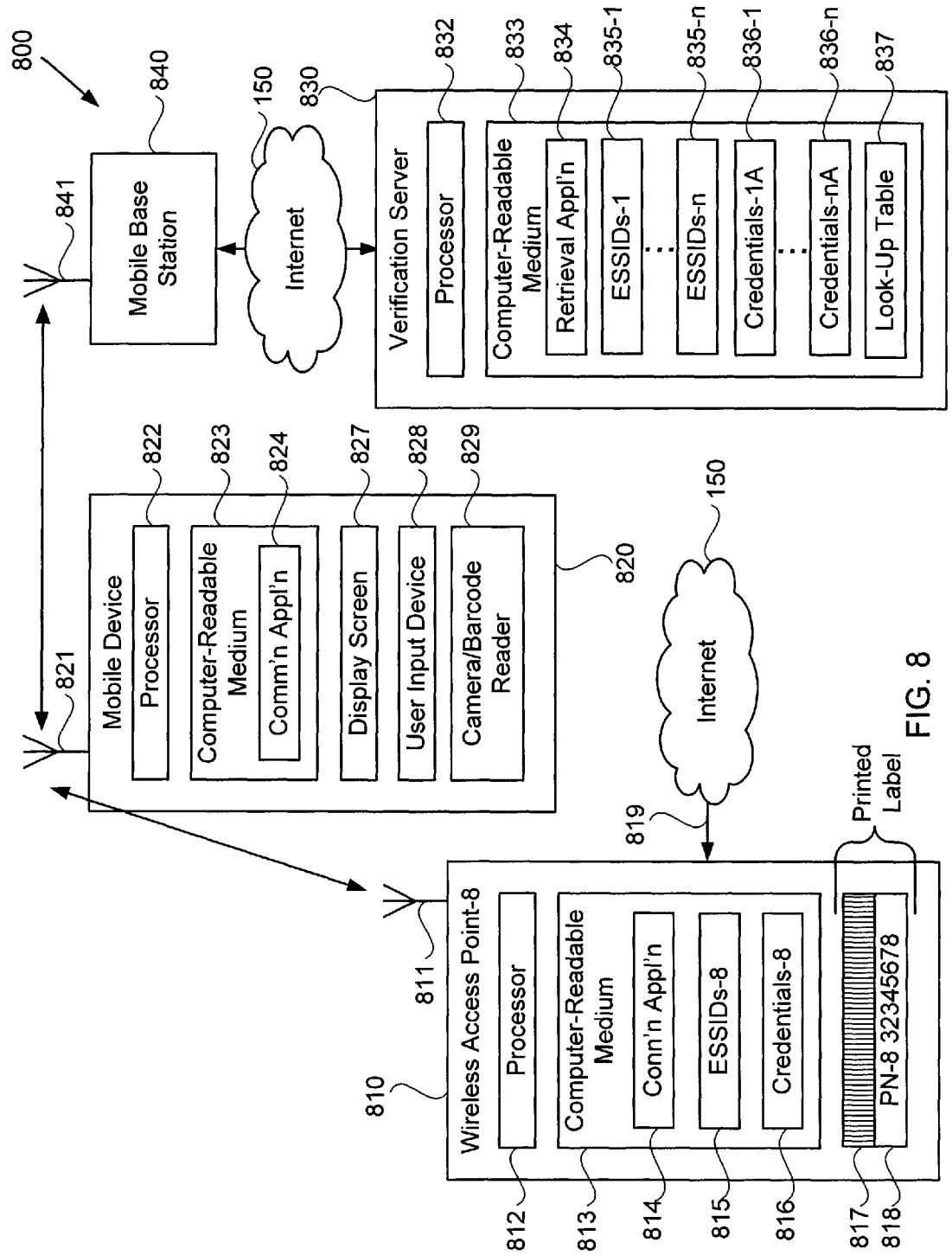
FIG. 8 illustrates a system for facilitating communication between a mobile device and a wireless access point based on remotely stored configuration parameters, according to some embodiments of the present invention.

FIG. 8 illustrates alternative embodiment of a system 800 for facilitating communication between a mobile device and a wireless access point based on remotely stored configuration parameters and a transmitted digital representation of an identifier disposed on the wireless access point. System 800 includes wireless access point-8 (WAP-8) 810, mobile device 820, and verification server 830. WAP-8 810 may be configured analogously to WAP 110 and WAP-4 410 described above, e.g., may include processor 812, computer-readable medium 813 storing connection application 814, ESSIDs-8 815, and credentials-8 816, and an identifier such as a printed label disposed on WAP-8 that may include, for example, barcode-8 217 and printed number-8 (PN-8) 818, and may be suitably connected to Internet 150 via port 819.

Mobile device 821 may be configured analogously to mobile device 120 described above, e.g., may include processor 822, computer-readable medium 823 configured to store communication application 824, display screen 827, user input device 828, and camera/barcode reader 829.

Remote verification server 830 may include processor 832 and computer-readable medium 833 configured to store retrieval application 834 as well as configuration parameters for a plurality of wireless access points, including WAP-8 810. For example, in the illustrated embodiment, the configuration parameters include n ESSIDs respectively associated with n wireless access points, e.g., ESSIDs-1 . . . ESSIDs-n 825-1 . . . 825-n, and n credentials for those wireless access points, e.g., credentials-1A . . . credentials-nA 826-1 . . . 826-nA, including ESSIDs -8 825-8 and credentials-8 A 826-8 (not explicitly shown in FIG. 8). Computer-readable medium 823 also stores a look-up table 837 that associates such configuration parameters with identifiers for corresponding wireless access points, and that may be configured analogously to look-up table 427 described above with reference to FIG. 4. The user of mobile device 820 may wish to wirelessly connect the mobile device to WAP-8 810 so as to wirelessly access Internet 150 via antenna 821 of mobile device 820 and antenna 811 and port 819 of WAP-8, but may not wish to and/or may not know how to manually configure mobile device 820 so as to establish such a connection. Computer-readable media 813, 823, and 833 of WAP-8 810, mobile device 820, and verification server 830 each respectively and independently may include an internal or external memory device, such as FLASH, RAM, ROM, EPROM, EEPROM, or a magnetic or optical disk or tape.

Mobile device 820 illustrated in FIG. 8 differs from mobile device 420 illustrated in FIG. 4 in that computer-readable medium 823 of mobile device 820 does not locally store configuration parameters for a plurality of wireless access points, nor a look-up table correlating those configuration parameters to digital representations of identifiers for those digital access points. Instead, verification server 830 is configured to store those configuration parameters 835-1 . . . 836-n and look-up table 837, and is configured to provide the configuration parameter for a selected wireless access point to mobile device 820 responsive to an appropriate request from mobile device 820. Specifically, communication application 824 stored in computer-readable medium 823 of mobile device is configured to obtain a digital representation of the identifier disposed on WAP-8 810, e.g., by scanning barcode 817, by obtaining an image of barcode 817 or printed number-8 (PN-8) 818, optionally, with further processing, or by receiving digits of PN-8 entered by a user via user input device 828, in a manner analogous to that of communication application 124 described above with reference to FIG. 1. Communication application 824 is configured to transmit the digital representation of the identifier to verification server 830, e.g., in an HTTP format such as secure HTTP (HTTPS). For example, mobile device 820 may be configured to communicate with verification server 830 a cellular transmission link, e.g., via antenna 841 of mobile base station 840 which is connected to verification server 830 via the Internet 150, using a cellular communication protocol such as frequency division multiple access (FDMA), code division multiple access (CDMA), wideband CDMA (WCDMA), or time division multiple access (TDMA).

Retrieval application 834 of verification server 830 is configured to receive the digital representation of the identifier from mobile device 820, e.g., via Internet 150, mobile base station 840, and antenna 841, and is configured to identify and select a stored configuration parameter in a manner analogous to that used by communication application 414 described further above with reference to FIGS. 4-6. For example, retrieval application 834 may the received digital representation of that identifier to digital representations stored in a column of look-up table 837, may identify a stored digital representation that matches the digital representation of the identifier, may select the serial number of the associated wireless access point based on the contents of another column of the look-up table, and may select a pointer to the configuration parameter for that wireless access point based on the contents of another column of the look-up table, in a manner analogous to that described above. As before, look-up table 837 alternatively may store the configuration parameters themselves, rather than pointers to separately stored configuration parameters.

Referring again to FIG. 8, retrieval application 834 is configured to obtain the configuration parameter for the selected wireless access point, here WAP-8 810, based on the selected pointer to the configuration parameter associated with that wireless access point, here the pointers to configuration parameter ESSID-n 835-2 and credentials-8A 836-2 stored in computer readable medium 833 of verification server 830. Retrieval application 834 is configured to transmit the selected configuration parameter to communication application 824 of mobile device 820, e.g., via Internet 150, mobile base station 840, and antenna 841, using a cellular communication protocol. The configuration parameter may be transmitted in HTTP format, e.g., secure HTTP (HTTPS). Communication application 824 of mobile device 820 is configured to automatically connect mobile device 820 to WAP-8 810 by suitably configuring the mobile device to send the selected configuration parameter, e.g., ESSIDs-8 835-2 and credentials-8A 836-2, to WAP-8.

For example, in some embodiments, communication application 824 causes mobile device 320 to wirelessly transmit one or more of ESSIDs-8 835-2 and credentials-8A 836-2 via antenna 821 using an appropriate signaling protocol, in one embodiment a WiFi protocol. For example, communication application 824 may formulate appropriate commands that contain ESSIDs-8 835-1 and credentials-8A 836-2, as well as the digital representation of the identifier disposed on WAP-8, and transmit such commands to WAP-8 810 via antenna 821. Optionally, one or more of ESSIDs-8 835-1 may be a "hidden" or "cloaked" ESSID that WAP-8 810 does not broadcast, but instead transmits only to mobile devices from which it has received a digital representation of the identifier. Connection application 814 of WAP-8 810 is configured to receive such transmitted commands via antenna 811, and to use ESSIDs-8 835-2 and credentials -8A 836-1 transmitted by mobile device 820 together with ESSIDs-8 815 and credentials-8 816 stored in computer-readable medium 814 to authenticate mobile device 820. If the ESSIDs-8 and credentials-8A transmitted by mobile device 820 match, or otherwise authenticate, the ESSIDs-8 and credentials-8 stored in computer-readable medium 814 of WAP-8 810, then connection application establishes a bidirectional communication connection between WAP-8 810 and mobile device 820, e.g., allowing mobile device 820 to access Internet 150 via WAP-8. FIG. 7 described above illustrates an exemplary signaling protocol that analogously may be used to establish a connection between WAP-8 810 and mobile device 820.

Note that although FIG. 8 illustrates configuration parameters 835-1 . . . 836-n and look-up table 837 as being separate from retrieval application 834, retrieval application 834 instead may be configured to include configuration parameters 835-1 . . . 836-n and look-up table 837. Also, look-up table 837 is only one example of a structure that retrieval application 834 may suitably use to identify and select a stored configuration parameter based on a digital representation of the identifier, e.g., printed label, disposed on WAP-8.

Figure 9:
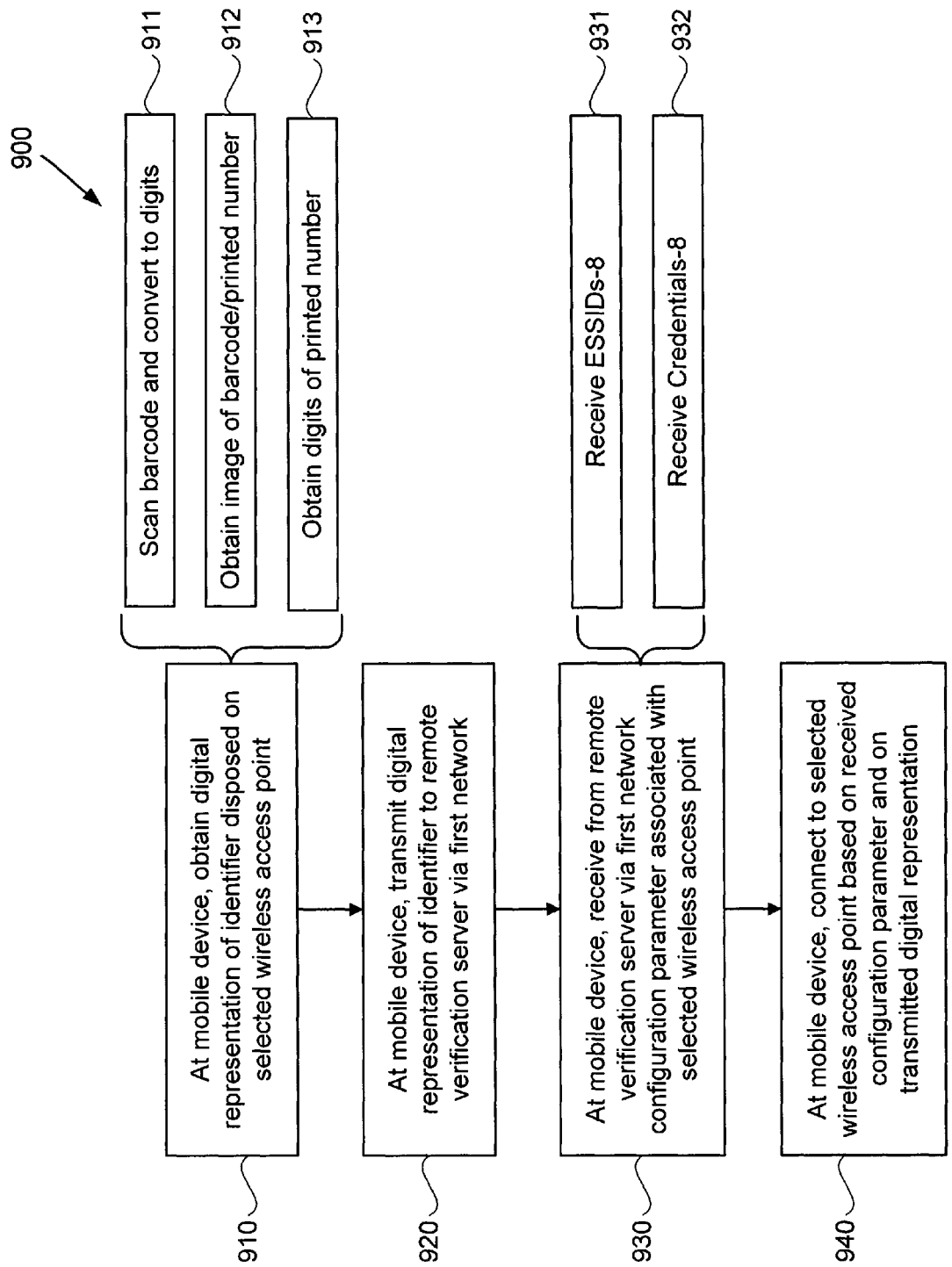
FIG. 9 illustrates steps in a method executed by a mobile device for facilitating communication between the mobile device and a wireless access point based on remotely stored configuration parameters, according to some embodiments of the present invention.

FIG. 9 illustrates steps in a mobile device-implemented method 900 of facilitating communication between a mobile device and a selected wireless access point, e.g., between mobile device 820 and WAP-8 810 illustrated in FIG. 8.

As illustrated in FIG. 9, method 900 includes obtaining a digital representation of an identifier disposed on a selected wireless access point, e.g., WAP-8, at the mobile device (step 920). For example, responsive to a user's input indicating that the user wishes to connect mobile device 820 to WAP-8 810, communication application 824 illustrated in FIG. 8 may prompt the user to scan barcode-8 817 disposed on WAP-8 using camera/barcode reader 829 (step 911 of method 900), to obtain an image of barcode-8 817 and/or of printed number-8 818 disposed on WAP-8 using camera/barcode reader 829 (step 912 of method 900), and/or to enter the digits of printed number-8 818 using user input device 829 (step 913 of method 900). Communication application 824 optionally may further process any images so obtained, e.g., to extract the barcode and/or digits of the printed number, as described above.

Referring again to FIG. 9, method 900 also includes transmitting the digital representation of the identifier from the mobile device to a remote verification server via a first network (step 920). For example, communication application 824 illustrated in FIG. 8 may transmit the digital representation of the identifier to verification server 830 via a cellular network including cellular antenna 841 and mobile base station 840, which connects to verification server 830 via Internet 150.

Method 900 illustrated in FIG. 9 also includes receiving from the remote verification server, at the mobile device, a configuration parameter associated with the selected wireless access point (step 930). For example, retrieval application 834 of verification server 830 may select a configuration parameter stored in computer-readable medium 833 and may return the selected configuration parameter to mobile device 820 responsive to receiving the digital representation of the identifier from the mobile device. Mobile device may receive, for example, an ESSID of the selected wireless access point (e.g., ESSIDs-8) (step 931), and/or a credential of the selected wireless access point (e.g., credentials-8A) (step 932).

As illustrated in FIG. 9, method 900 further includes connecting the mobile device to the selected wireless access point based on the received configuration parameter and on transmission of the digital representation of the identifier (step 940). For example, as described above with reference to FIG. 8, mobile device 820 may transmit the selected configuration parameter to WAP-8 810, e.g., the ESSIDs-8 and credentials-8A, along with the digital representation of the identifier disposed on WAP-8, responsive to which WAP-8 may securely bidirectionally communicate with the mobile device. An exemplary signaling protocol for establishing a connection between WAP-8 810 and mobile device 820 based on the received configuration parameter is described further above with reference to FIG. 7.

FIG. 10 illustrates steps in a verification server-implemented method 1000 of facilitating communication between a mobile device and a selected wireless access point, e.g., between mobile device 820 and WAP-8 810 illustrated in FIG. 8.

Method 1000 includes storing configuration parameters associated with a plurality of wireless access point identifiers at the verification server (step 1010). For example, computer-readable medium 833 of verification server 830 may store n ESSIDs respectively associated with n wireless access points, e.g., ESSIDs-1 . . . ESSIDs-n 835-1 . . . 835-n illustrated in FIG. 8 (step 1011 of method 1000); may store n credentials for those wireless access points, e.g., credentials -1. . . credentials-n 836-1A . . . 836-nA (step 1012 of method 1000); and optionally also may store a look-up table 837 that associates such configuration parameters with identifiers for corresponding wireless access points, in a manner analogous to that described above with reference to FIG. 5. The configuration parameters and the lookup table may be part of, or may be accessed by retrieval application 834 executed by processor 832 of verification server 830.

As illustrated in FIG. 10, method 1000 includes receiving at the verification server a digital representation of an identifier disposed on a selected wireless access point from a mobile device, via a first network (step 1020). For example, verification server 830 illustrated in FIG. 8 may receive the digits of a barcode and/or printed number (step 1021 of method 1000) and/or may receive an image of a barcode and/or printed number (step 1022 of method 1000) via the cellular network.

Referring again to FIG. 10, method 1000 also includes selecting, at the verification server, a stored configuration parameter associated with the selected wireless access point based on the received digital representation of the identifier for that wireless access point (step 1030). For example, as described above, retrieval application 834 of verification server 830 may compare the received digital representation of the identifier to a plurality of stored digital representations of identifiers of a corresponding plurality of wireless access points, and may select the configuration parameter corresponding to a matching identifier, e.g., using look-up table 837 stored in computer readable medium 833.

Referring again to FIG. 10, method 1000 also includes transmitting the selected configuration parameter associated with the selected wireless access point from the verification server to the mobile device, via the first network (step 1030). For example, retrieval application 834 of verification server 830 may transmit the selected configuration parameter to mobile device 820 via the cellular network, e.g., via mobile base station 840 and cellular antenna 841. The mobile device then may connect to the selected wireless access point (e.g., WAP-8) based on the received configuration parameter and transmission of the digital representation of the identifier, as described further above with reference to mobile-device implemented method 900 illustrated in FIG. 9 and the signaling protocol illustrated in FIG. 7.

Although the embodiments described above are primarily directed to facilitating communication between a mobile device and a wireless access point, it should be appreciated that any two devices may be wirelessly connected using the principles of the present invention. For example, a first device may have a identifier disposed thereon, e.g., a printed label having a barcode or number, and a second device may have an application stored thereon that is configured to use an input device, e.g., a barcode scanner, camera, or user input device, to obtain a digital representation of the first device's identifier. The application then may use that digital representation to access locally stored data correlating identifiers to configuration parameters so as to select a configuration parameter for use in connecting to the first device; or may send the digital representation to a remote server that stores data correlating identifiers to configuration parameters, and receive from the remote server a configuration parameter for use in connecting to the first device. The second device then may use the configuration parameter to connect to the first device.

Additionally, note that embodiments of the present invention also may facilitate providing customer support to the mobile device's user for troubleshooting problems connecting to a wireless access point (or other device). For example, communication application 814 of mobile device 820 may be configured to generate a "ticket" if the user encounters difficulty connecting to WAP-8 810 illustrated in FIG. 8, and to communicate that ticket along with a digital representation of WAP-8's identifier to verification server 830 via the cellular network. Retrieval application 834 of verification server 830, or another suitable application of verification server 830, may be configured to establish a connection between mobile device 820 and a remote customer support center via the cellular network and Internet 150, and to transmit the ticket and the digital representation of WAP-8's identifier to the remote customer support center so that a live or automated attendant at the customer support center may assist the user in connecting mobile device 820 to WAP-8 810.

While some components of WAP 110, WAP-4 410, WAP-8 810, and mobile devices 120, 420, and 820 may be commercially available, other components therein may be suitably configured so as to implement aspects of present invention, e.g., printed labels disposed on the WAP, connection applications, communication applications, configuration parameters, lookup tables, and the like. Such components that facilitate communication between a WAP and a mobile device without requiring the user to have technical expertise, e.g., to manually configure the mobile device, may be considered to constitute an embodiment of the inventive system.

While various illustrative embodiments of the invention are described above, it will be apparent to one skilled in the art that various changes and modifications may be made therein without departing from the scope of the invention. For example, although the embodiments described above primarily describe the use of printed labels having printed barcodes and/or printed numbers disposed thereon to identify a device, such as a wireless access point, it should be understood that the device alternatively may dynamically display the identifier, e.g., using a display screen. Or, for example, the barcode disposed on a first device (e.g., a wireless access point) may include a QR code that encodes one or more configuration parameters that a second device (e.g., a mobile device) may use to connect to the first device without requiring the second device to have previously stored such configuration parameters or to connect to a remote verification server to obtain such configuration parameters. The appended claims are intended to cover all such changes and modifications that fall within the true spirit and scope of the invention.

What is claimed:

1. A system for establishing a secure wireless connection to a mobile device comprising a processor and a non-volatile computer readable medium, the system comprising:
   a wireless access point having a printed label disposed thereon, the printed label comprising an identifier;
   a communication application stored in the non-volatile computer readable medium of the mobile device and configured to cause the processor of the mobile device to perform the steps of:
   (a) obtaining a digital representation of the identifier of the wireless access point;
   (b) connecting to the wireless access point;
   (c) transmitting the digital representation of the identifier to the wireless access point;
   (d) receiving from the wireless access point an ESSID and a credential responsive to the transmitted digital representation; and
   (e) securely connecting to the wireless access point based on the transmitted ESSID and credential,
   further comprising a plurality of configuration parameters stored in the non-volatile computer readable medium and associated with a corresponding plurality of identifiers for a corresponding plurality of wireless access points,
   wherein the communication application is configured to cause the processor of the mobile device to perform the additional step of:
   (f) selecting a stored configuration parameter based on the digital representation of the identifier; and
   wherein the selected configuration parameter comprises a first ESSID and first and second credentials, and
   wherein the communication application is configured to cause the processor of the mobile device to connect to the wireless access point in step (b) further based on the selected configuration parameter by performing the steps of:
   (g) transmitting the first ESSID and the first credential to the wireless access point to establish a guest connection to the wireless access point; and
   (h) using the second credential to establish a secure sockets layer/secure shell (SSL/SSH) connection to the wireless access point via the guest connection.

2. The system of claim 1, wherein the selected configuration parameter comprises at least one of an ESSID and a credential.

3. The system of claim 1, further comprising a verification server, the verification server storing a configuration parameter associated with the identifier,
   the communication application configured to cause the processor of the mobile device to perform the steps of:
   transmitting the digital representation of the identifier to the verification server; and
   receiving from the verification server a configuration parameter associated with the identifier;
   wherein the communication application is configured to cause the processor of the mobile device to connect to the wireless access point in step (b) further based on the received configuration parameter.

4. The system of claim 3, wherein the received configuration parameter comprises at least one of an ESSID and a credential.

5. The system of claim 3, wherein the verification server is configured to store the plurality of configuration parameters in a look-up table on a computer-readable medium.

6. The system of claim 1, wherein the identifier comprises a bar code identifying the access point, and wherein the communication application is configured to cause the processor to obtain the digital representation of the identifier by scanning the bar code and converting the scanned bar code into digits.

7. The system of claim 1, wherein the identifier comprises a printed number or a barcode identifying the access point, and wherein the communication application is configured to cause the processor to obtain the digital representation of the identifier by obtaining an image of the printed number or the barcode.

8. The system of claim 1, wherein the identifier comprises a printed number identifying the access point, and wherein the communication application is configured to cause the processor to obtain the digital representation of the identifier by receiving user input of the digits of the printed number or by obtaining an image of the printed number and recognizing the digits of the printed number from the image.

9. A system for establishing a secure wireless connection to a mobile device comprising a processor and a non-volatile computer readable medium, the system comprising:
- a wireless access point having a printed label disposed thereon, the printed label comprising an identifier;
- a communication application stored in the non-volatile computer readable medium of the mobile device and configured to cause the processor of the mobile device to perform the steps of:
  (a) obtaining a digital representation of the identifier of the wireless access point;
  (b) connecting to the wireless access point;
  (c) transmitting the digital representation of the identifier to the wireless access point;
  (d) receiving from the wireless access point an ESSID and a credential responsive to the transmitted digital representation; and
  (e) securely connecting to the wireless access point based on the transmitted ESSID and credential,
- further comprising a verification server, the verification server storing a configuration parameter associated with the identifier,
- the communication application configured to cause the processor of the mobile device to perform the steps of:
  (f) transmitting the digital representation of the identifier to the verification server; and
  (g) receiving from the verification server a configuration parameter associated with the identifier;
- wherein the received configuration parameter comprises a first ESSID and first and second credentials, and
- wherein the communication application is configured to cause the processor of the mobile device to connect to the wireless access point in step (b) further based on the received configuration parameter by performing the steps of:
  (h) transmitting the first ESSID and the first credential to the wireless access point to establish a guest connection to the wireless access point; and
  (i) using the second credential to establish a secure sockets layer/secure shell (SSL/SSH) connection to the wireless access point via the guest connection.

10. The system of claim 9, wherein the digital representation of the identifier comprises digits of a barcode or of a printed number.

11. The system of claim 9, wherein the digital representation of the identifier comprises an image of a printed number or of a barcode.

12. The system of claim 9, wherein the verification server and the mobile device communicate with one another via a cellular network.

13. The system of claim 9, wherein the selected configuration parameter comprises at least one of an ESSID and a credential.

14. The system of claim 9, wherein the verification server stores the plurality of configuration parameters in a look-up table.

15. A mobile device-implemented method for facilitating communication between the mobile device and a wireless access point, the method comprising:
  (a) obtaining a digital representation of an identifier on a printed label disposed on the wireless access point;
  (b) connecting to the wireless access point;
  (c) transmitting the digital representation of the identifier to the wireless access point;
  (d) receiving from the wireless access point an ESSID and a credential responsive to the transmitted digital representation;
  (e) securely connecting to the wireless access point based on the ESSID and credential;
  (f) storing at the mobile device a plurality of configuration parameters associated with a corresponding plurality of wireless access point identifiers; and
  (g) based on the obtained digital representation of the identifier, selecting a stored configuration parameter of the plurality of stored configuration parameters that corresponds to that identifier,
- wherein the selected configuration parameter comprises a first ESSID and first and second credentials, wherein the mobile device connects to the wireless access point in step (b) further based on the selected configuration parameter by performing the steps of:
  (h) transmitting the first ESSID and the first credential to the wireless access point to establish a guest connection to the wireless access point; and
  (i) using the second credential to establish a secure sockets layer/secure shell (SSL/SSH) connection to the wireless access point via the guest connection.

16. The method of claim 15, wherein the selected configuration parameter comprises at least one of an ESSID and a credential.

17. The method of claim 15, further comprising:
- transmitting the digital representation of the identifier to a verification server; and
- receiving a configuration parameter associated with the identifier from the verification server;
- wherein the mobile device connects to the wireless access point in step (b) further based on the received configuration parameter.

18. The method of claim 17, wherein the received configuration parameter comprises at least one of an ESSID and a credential.

19. The method of claim 15, wherein the identifier comprises a bar code identifying the access point, and wherein the mobile device obtains the digital representation of the identifier by scanning the bar code and converting the scanned bar code into digits.

20. The method of claim 15, wherein the identifier comprises a printed number or a bar code identifying the access point, and wherein the mobile device obtains the digital representation of the identifier by obtaining an image of the printed number or the bar code.

21. The method of claim 15, wherein the identifier comprises a printed number identifying the access point, and wherein the mobile device obtains the digital representation of the identifier by receiving user input of the digits of the printed number or by obtaining an image of the printed number and recognizing the digits of the printed number from the image.

22. A mobile device-implemented method for facilitating communication between the mobile device and a wireless access point, the method comprising:
   (a) obtaining a digital representation of an identifier on a printed label disposed on the wireless access point;
   (b) connecting to the wireless access point;
   (c) transmitting the digital representation of the identifier to the wireless access point;
   (d) receiving from the wireless access point an ESSID and a credential responsive to the transmitted digital representation;
   (e) securely connecting to the wireless access point based on the ESSID and credential;
   (f) transmitting the digital representation of the identifier to a verification server; and
   (g) receiving a configuration parameter associated with the identifier from the verification server;
   wherein the mobile device connects to the wireless access point in step (b) further based on the received configuration parameter, and
   wherein the received configuration parameter comprises a first ESSID and first and second credentials, the method further comprising:
   (h) transmitting the first ESSID and the first credential to the wireless access point to establish a guest connection to the wireless access point; and
   (i) using the second credential to establish a secure sockets layer/secure shell (SSL/SSH) connection to the wireless access point via the guest connection.

23. The method of claim 22, wherein the digital representation of the identifier comprises digits of a barcode or of a printed number.

24. The method of claim 22, wherein the digital representation of the identifier comprises an image of a printed number or of a barcode.

* * * * *